235-400 SR

OR 2,916,208

NO XR

Dec. 8, 1959 L. W. IMM 2,916,208

ANTI-SUBMARINE ATTACK DIRECTOR

Filed Nov. 9, 1945 22 Sheets-Sheet 1

INVENTOR.
LEWIS W. IMM
BY Hastings W. Baker
ATTORNEY

ANTI-SUBMARINE ATTACK DIRECTOR

INVENTOR.
LEWIS W. IMM
BY Hastings W Baker
ATTORNEY

ANTI-SUBMARINE ATTACK DIRECTOR

Filed Nov. 9, 1945 22 Sheets-Sheet 3

INVENTOR.
LEWIS W. IMM
BY Hastings W Baker
ATTORNEY.

Dec. 8, 1959 L. W. IMM 2,916,208

ANTI-SUBMARINE ATTACK DIRECTOR

Filed Nov. 9, 1945 22 Sheets-Sheet 4

INVENTOR.
LEWIS W. IMM
BY Hastings W. Baker
ATTORNEY.

Dec. 8, 1959 L. W. IMM 2,916,208

ANTI-SUBMARINE ATTACK DIRECTOR

Filed Nov. 9, 1945 22 Sheets-Sheet 5

INVENTOR
LEWIS W. IMM
BY Hastings W. Baker
ATTORNEY.

INVENTOR.
LEWIS W. IMM
BY Hastings W. Baker
ATTORNEY.

ANTI-SUBMARINE ATTACK DIRECTOR

INVENTOR.
LEWIS W. IMM
BY Hastings W. Baker
ATTORNEY.

ANTI-SUBMARINE ATTACK DIRECTOR

Filed Nov. 9, 1945

INVENTOR.
LEWIS W. IMM
BY Hastings W. Baker
ATTORNEY.

ANTI-SUBMARINE ATTACK DIRECTOR

INVENTOR.
LEWIS W. IMM
BY Hastings W. Baker
ATTORNEY.

INVENTOR.
LEWIS W. IMM
BY Hastings W. Baker
ATTORNEY.

INVENTOR.
Lewis W. Imm
BY Hastings W. Baker
ATTORNEY.

INVENTOR.
LEWIS W. IMM
BY Hastings W. Baker
ATTORNEY.

ANTI-SUBMARINE ATTACK DIRECTOR

Filed Nov. 9, 1945 22 Sheets-Sheet 13

INVENTOR.
LEWIS W. IMM
BY Hastings W. Baker
ATTORNEY

ANTI-SUBMARINE ATTACK DIRECTOR

Filed Nov. 9, 1945 22 Sheets-Sheet 14

INVENTOR.
LEWIS W. IMM
BY Hastings W. Baker
ATTORNEY.

ANTI-SUBMARINE ATTACK DIRECTOR

Filed Nov. 9, 1945 22 Sheets-Sheet 15

INVENTOR.
LEWIS W. IMM
BY Hastings V. Baker
ATTORNEY.

INVENTOR.
LEWIS W. IMM
BY Hastings W. Baker
ATTORNEY

ANTI-SUBMARINE ATTACK DIRECTOR

Filed Nov. 9, 1945

INVENTOR.
LEWIS W. IMM
BY Hastings W Baker
ATTORNEY

Dec. 8, 1959 L. W. IMM 2,916,208

ANTI-SUBMARINE ATTACK DIRECTOR

Filed Nov. 9, 1945 22 Sheets-Sheet 18

INVENTOR.
LEWIS W. IMM
BY Hastings W Baker
ATTORNEY.

ANTI-SUBMARINE ATTACK DIRECTOR

Filed Nov. 9, 1945 22 Sheets-Sheet 19

INVENTOR.
LEWIS W. IMM
BY Hastings W. Baker
ATTORNEY

Fig. 41.
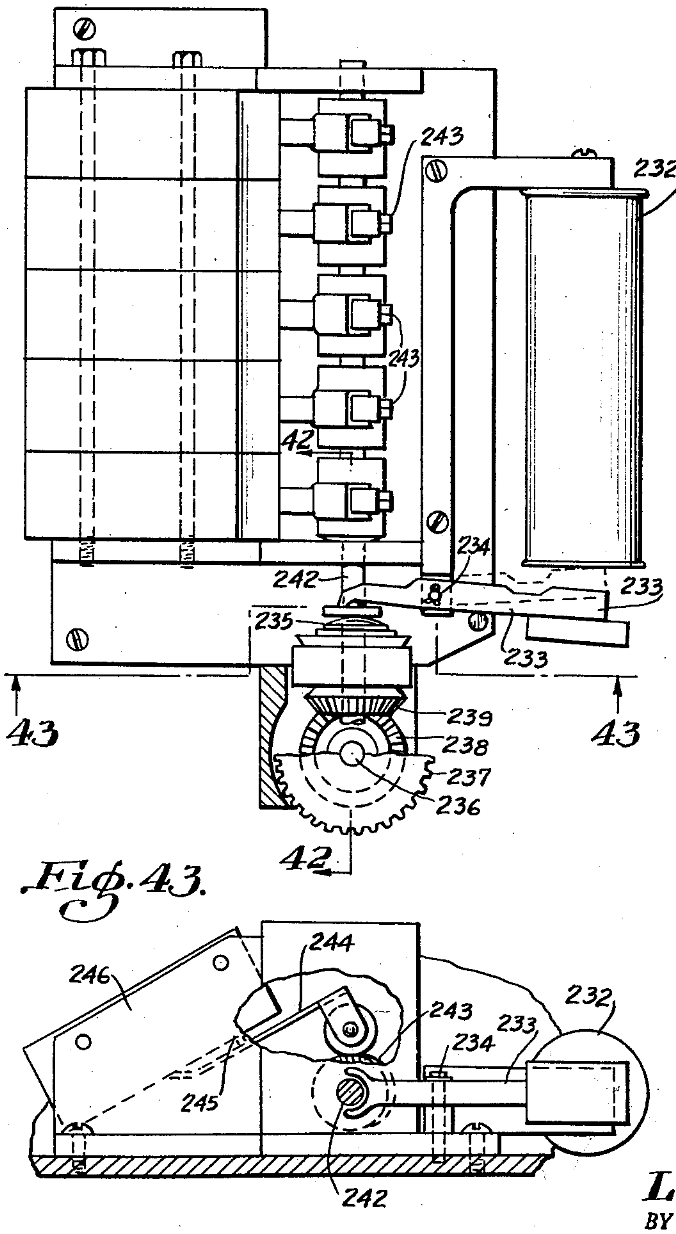
Fig. 41. Fig. 43.
Fig. 42.
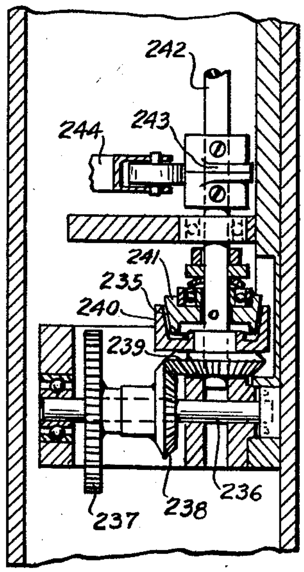
INVENTOR.
LEWIS W. IMM
BY Hastings W. Baker
ATTORNEY.

ANTI-SUBMARINE ATTACK DIRECTOR

INVENTOR.
LEWIS W. IMM
BY Hastings W. Baker
ATTORNEY.

INVENTOR.
Lewis W. Imm
BY Hastings W. Baker
ATTORNEY

United States Patent Office 2,916,208

Patented Dec. 8, 1959

2,916,208

ANTI-SUBMARINE ATTACK DIRECTOR

Lewis W. Imm, Glendale, Calif., assignor to Librascope, Incorporated, Burbank, Calif., a corporation of California Application November 9, 1945, Serial No. 627,587

9 Claims. (Cl. 235—61.5)

The object of this invention is to provide an anti-submarine attack director which may be used in determining the course to steer and the time to fire in attacking submarines, with either ahead thrown charges or stern dropped charges. It is designed to be operated in conjunction with known information, such as submarine depth, dead time, time lag, distance to dropping station, the destroyer's speed, and the distance from the position of the sound projector head when the charge was thrown to the point where the charge strikes the water, measured with the destroyer at standstill. It is also designed to be operated in conjunction with the information received audibly from the sound station submarine detecting device, such as ranges and bearings.

The invention may be better understood by referring to the attached drawings, in which:

Figure 41 is a plan view of the time to fire timing mechanism sometimes referred to as firing time mechanism.

Figure 42 is a view, largely in cross section, taken on the line 42—42 of Figure 41.

Figure 43 is a side elevational view on the line 43—43 of Figure 41, certain of the parts being omitted for the sake of clearness.

Figure 40:
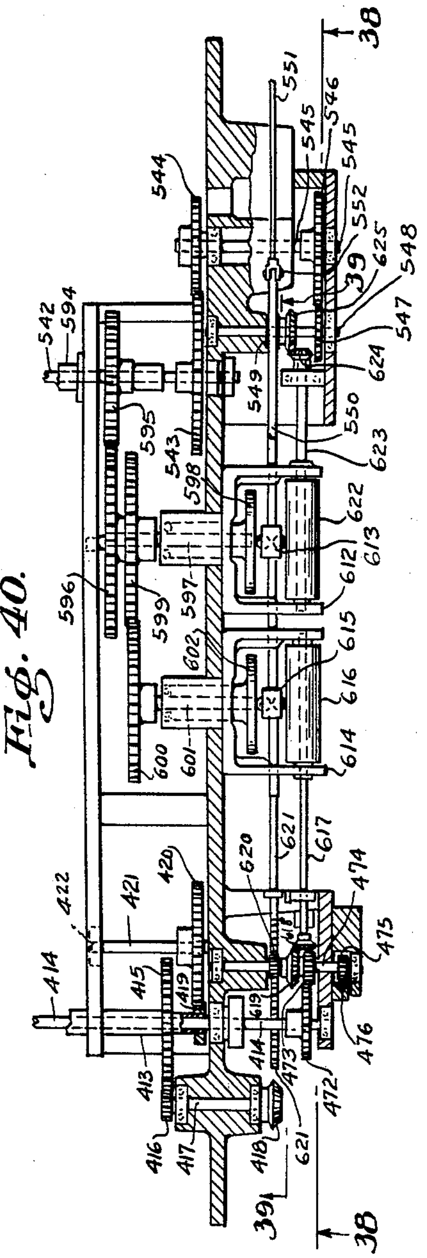
Figure 40 is a view, partly in cross section, on the line 40—40 of Figure 38.
Figure 38:
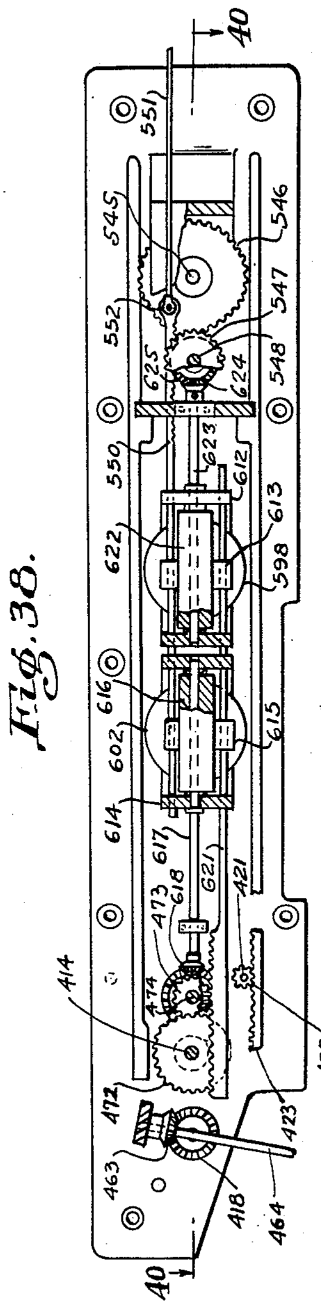
Figure 38 is a plan view of the target speed component resolver shown in the lower portion of Figure 31 and on the line 38—38 of Figure 40.
Figure 39:
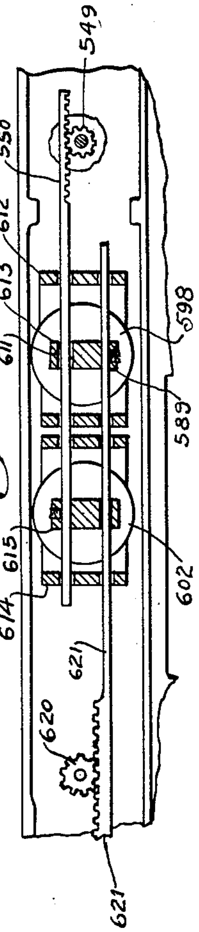
Figure 39 is a view, partly in cross section, on the line 39—39 of Figure 40.
Figure 45:
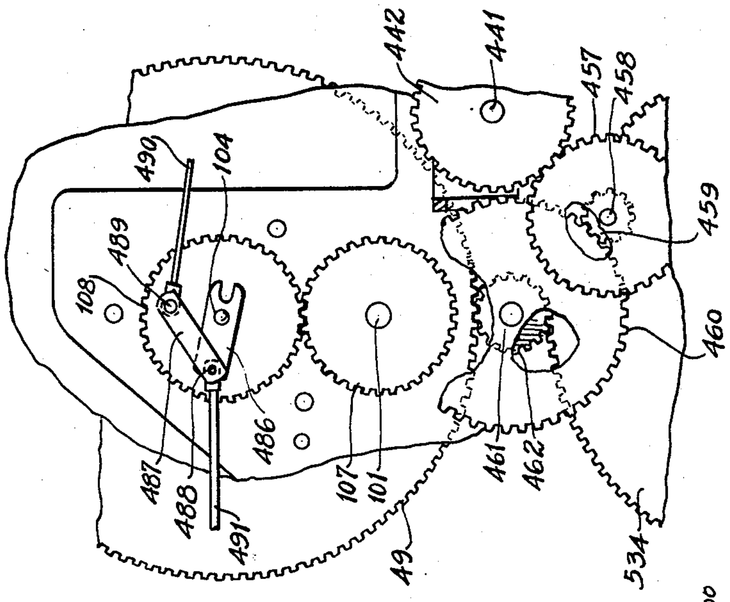
Figure 45 is a bottom plan view of the driving gearing for the submarine bearing.
Figure 45A:
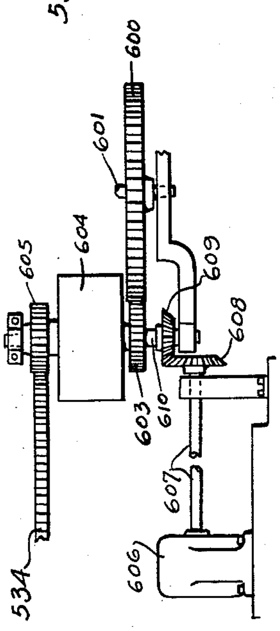

Figure 45*a* is an elevational view of the driving means leading to the target speed component resolver shown in Figures 38, 39 and 40.

Figures 47, 48:
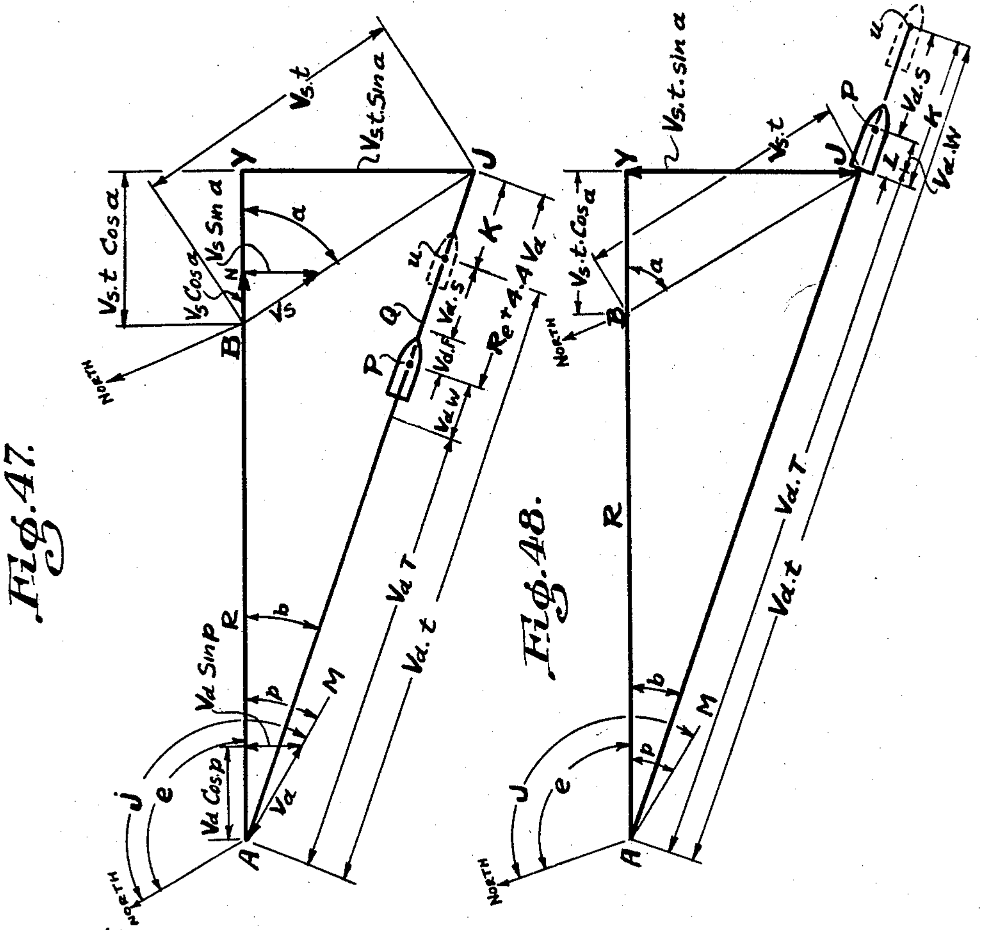
Figure 46:
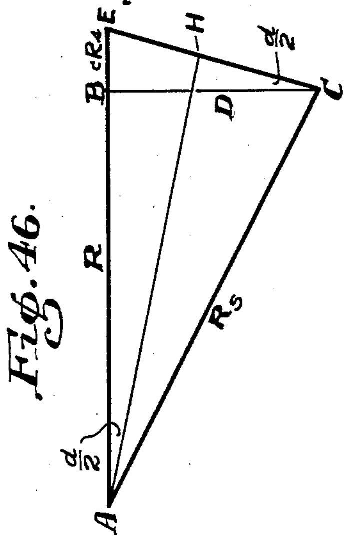

Figures 46, 47 and 48 are geometrical views useful in explaining the formulae involved.

*Definitions*

As used herein the "line of sight" is the horizontal, straight line passing through the sound projector head on the destroyer and a point directly above the center of the target or submarine.

Inasmuch as certain formulae are employed in the solution of the various problems it is necessary to define what is meant by the symbols employed in the said formulae. As used herein the various symbols may be defined as follows:

R*s* is slant range.
R is horizontal range as measured along the line of sight.
*c*R*s* is the range correction to slant range or the slant range minus the horizontal range.
D is the depth of the submarine.
V*s* denotes the submarine's speed in knots.
V*d* denotes the destroyer's speed in knots.
*a* is the submarine's course relative to the line of sight to the submarine.
*b* denotes the course to steer, being the angle between the attack course and the line of sight to the submarine.
*p* is the angle between the course which the desrtoyer is now traveling and the line of sight to the submarine.

$\frac{dp}{dt}$ equals rate of change of *p*, sometimes called "bearing rate."

$\frac{dR}{dt}$ equals rate of change of R, commonly known as "range rate."

T denotes the time remaining until the instant to fire.
*t* denotes the time remaining until the charge explodes.
K is the distance between the destroyer position and the position of the charge when it explodes—the destroyer position being the location of the sound projector head, which is approximately one-third of the length of the destroyer measured aft of the bow.
L is the distance from the sound projector head to the dropping station, this distance being useful in stern attack information.
R*e* is the distance the charge would have traveled from the position of the sound projector head when the charge is thrown to the point where the charge strikes the water if the charge had been thrown with the destroyer at standstill.
S denotes the sinking time or the interval of time between the instant the charge enters the water and the instant the charge explodes.
F denotes the time of flight, or the time interval between the instant of throwing the charge in an ahead attack and the instant the charge enters the water.
W is dead time, or is the interval of time between the instant the charge shoudl be fired and the instant it is fired.
*S*+*F* is the time lag which is the sum of the sinking time "S" and the time of flight "F."
R*f* is the range at which the firing time mechanism is actuated, which is, for example—the range at the time when the destroyer is approximately 30 seconds from the instant of firing.
*e* is the bearing of the submarine as measured from north.
*j* is the course of the destroyer as measured from north.

*Formulae*

Referring to the right triangle ABC shown in Fig. 46, the point A denotes the present position of the destroyer, C denotes the center of the submarine, and the point B denotes the point on the surface of the water immediately above the submarine. The line AB denotes the horizontal range R of the submarine, R*s* denotes the slant range, and *c*R*s* denotes the difference between R*s* and R so that $$Rs=R+cRs \qquad \text{(Formula \#1)}$$

In Fig. 46 let *d* denote the angle BAC and bisect this angle with the line AH. Extend the line AB to E so that the line AE equals slant range R*s* so that BE equals *c*R*s* and draw EC. The triangles BEC and AEH are similar so that angles BAH and BCE are each equal to *d*/2.

$$\text{Tan } d=\frac{D}{R}$$

and for small angles, $$\frac{\tan d}{2}\cong\tan\frac{d}{2}$$

$$\frac{\tan d}{2}=\frac{\frac{D}{R}}{2}=\frac{D}{2R}\cong\tan\frac{d}{2}$$

In triangle BCE, $$\tan\frac{d}{2}=\frac{cRs}{D}$$

Therefore, $$cRs=D\tan\frac{d}{2}\cong D\left(\frac{D}{2R}\right)=\frac{D^2}{2R}$$

For the ranges of D to be used in the computations, it is found that a more nearly correct value for the above approximate value is to consider that $$cRs=\frac{D^2}{2.38R} \qquad \text{(Formula \#2)}$$

By resolving the motions of the target and destroyer into components in the line of sight and transversely thereto respectively, the range and bearing rates are obtained as follows:

In Fig. 47 let A be the present position of the destroyer which is traveling along line AM at velocity V*d* and let B represent the present position of the submarine which is travelling along the line BJ at velocity V*s*, J being the position of the submarine at the moment the charge explodes at the position of the submarine. The line AJ represents the course the destroyer should follow in order to properly fire a charge which will intercept the submarine. Let R represent the horizontal range between A and B. Extend AB to N and call NBJ the angle *a* and call MAB the angle *p*. The component of V*d* along line AN is *Vd* cos *p* and the component of V*s* along line AN is *Vs* cos *a*. Therefore, the rate of change in R which is $$\frac{dR}{dt}=Vd\cos p-Vs\cos a \qquad \text{(Formula \#3)}$$

In the like manner the component of V*d* perpendicular to AN is *Vd* sin *p* and the component of V*s* perpendicular to AN is *Vs* sin *a*. Therefore, the rate of change in the angle *p* is $$\frac{dp}{dt}=\frac{Vd\sin p-Vs\sin a}{R} \qquad \text{(Formula \#4)}$$

Referring to Fig. 47, it is obvious that the rate of change of the angle *e* is the same as the rate of change of the angle *p*.

With reference to the values *Vs* cos *a* and *Vs* sin *a* as shown in Fig. 47, the first calculus derivative of *Vs* cos *a* is $$-Vs\sin a \qquad \text{(Formula \#5)}$$

which is the rate of change of *Vs* cos *a*, and the first calculus derivative of *Vs* sin *a* is $$Vs\cos a \qquad \text{(Formula \#6)}$$

which is the rate of change of *Vs* sin *a*.

In Fig. 47 there is represented the horizontal graphical analysis of an ahead thrown attack in which the projectile is fired ahead of the destroyer at the instant when the sound projector head on the destroyer reached the point P. The distance PJ would therefore be R*e* plus 4.4V*d*, the 4.4V$d$ representing the additional distance in yards that the projectile travels by reason of the speed of the destroyer over what it would have traveled if the destroyer had been standing still. The distance PQ is V$d$F which is the distance the destroyer would travel during the time of flight F of the projectile. The distance QU is V$d$S, which is the distance the destroyer would travel during the sinking time S of the projectile. At the end of the sinking time the charge explodes below the point J. The distance UJ is K so therefore $$VdF+VdS+K=Re+4.4Vd$$

and $K=Re+4.4Vd-Vd(F+S)$ for an ahead thrown attack.

In Fig. 48 there is represented a horizontal graphical analysis of a stern dropped attack in which the projectile is dropped off a point on the stern of the destroyer. The distance between the point J and P is L. In a stern dropped attack the time of flight F is substantially zero and is disregarded. The distance PU is V$d$S, which is the distance the destroyer would travel during the sinking time S of the projectile. Therefore, $K=-(L+VdS)$ for a stern dropped attack. The minus sign is inserted in the latter expression for K because we consider K to be positive when ahead of the destroyer and to be negative when aft of the destroyer.

If the two above expressions for K were combined into $$K=Re+4.4Vd-L-Vd(F+S) \quad \text{(Formula \#7)}$$

we then have an expression for K which is applicable for both an ahead thrown attack and a stern dropped attack.

In Fig. 47 drop a perpendicular line from J to line AB, extended to Y.

$AJ=Vdt+K$ and $R+Vst\cos a=(Vdt+K)\cos b=Vdt\cos b+K\cos b$ $R+Vst\cos a-Vdt\cos b=K\cos b$ $R+t(Vs\cos a-Vd\cos b)=K\cos b$ When tht destroyer is proceeding on the proper course the angle $p$ equals the angle $b$ and so $$-\frac{dR}{dt}=-Vd\cos b+Vs\cos a$$

$$R+t\left(-\frac{dR}{dt}\right)=K\cos b \text{ and } t=\frac{K\cos b-R}{-\frac{dR}{dt}}$$

From Fig. 47, $Vst\sin a=(Vdt+K)\sin b$ $$\text{Sin } b=\frac{Vst\sin a}{Vdt+K}=\frac{Vs\sin a}{Vd+\frac{K}{t}}=\frac{Vs\sin a}{Vd+\frac{K}{\frac{K\cos b-R}{-\frac{dR}{dt}}}}$$

Hence $$\text{Sin } b=\frac{Vs\sin a}{Vd+\frac{K\frac{dR}{dt}}{R-K\cos b}} \quad \text{(Formula \#8)}$$

In a similar manner this Formula #8 could be derived from Fig. 48.

Figure 2:
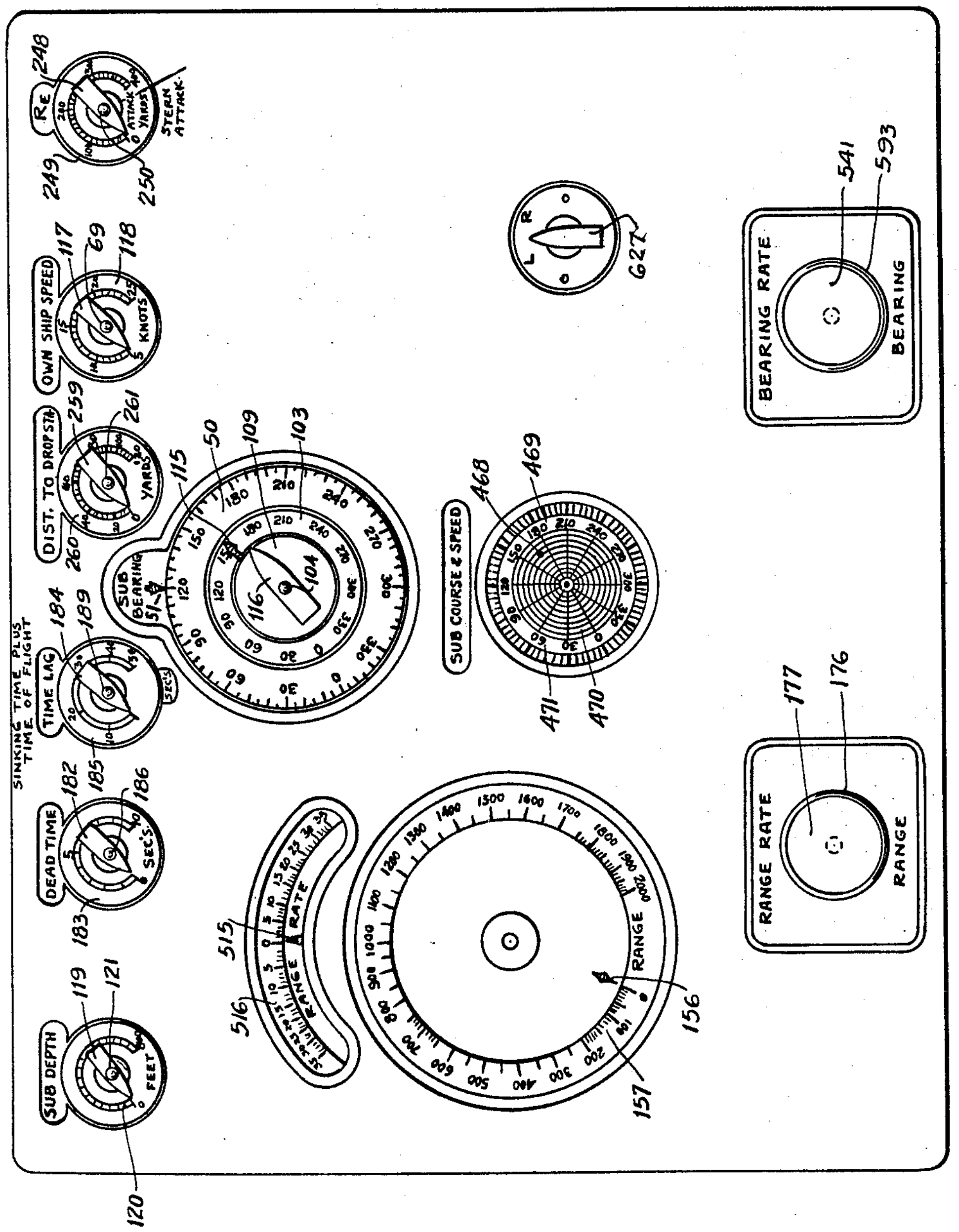
Figure 2 is a plan view of the main computer.

As will hereafter be described, there is a course to steer pointer 115, Fig. 2 which indicates the calculated value of angle $b$ as obtained from calculated value of sin $b$. The nearer that the value of the angle $p$ as indicated by the pointer 116, Fig. 2 approaches the value of the angle $b$, indicated by the pointer 115, Fig. 2, the more nearly the course to steer pointer would indicate the true value of $b$ so that when the destroyer is on the course indicated by the course to steer pointer, this pointer 115 will indicate the exact value of the angle $b$.

The time $t$ remaining from any given instant of observation of the instrument until the charge explodes equals the sum of the time T from any given instant of observation of the instrument until the instant to fire plus dead time W plus time of flight F plus sinking time S, that is $$t=T+W+F+S \quad \text{(Formula \#9)}$$

As heretofore explained in connection with Formula #8

$$R+t\left(-\frac{dR}{dt}\right)=K\cos b$$

$$R=K\cos b+t\times\frac{dR}{dt}$$

Substituting value of $t$ in Formula #9 in above expression, we have $$R=K\cos b+(T+W+F+S)\frac{dR}{dt} \quad \text{(Formula \#10)}$$

The value of T is set at 30 seconds or some other predetermined number of seconds.

Figure 1:
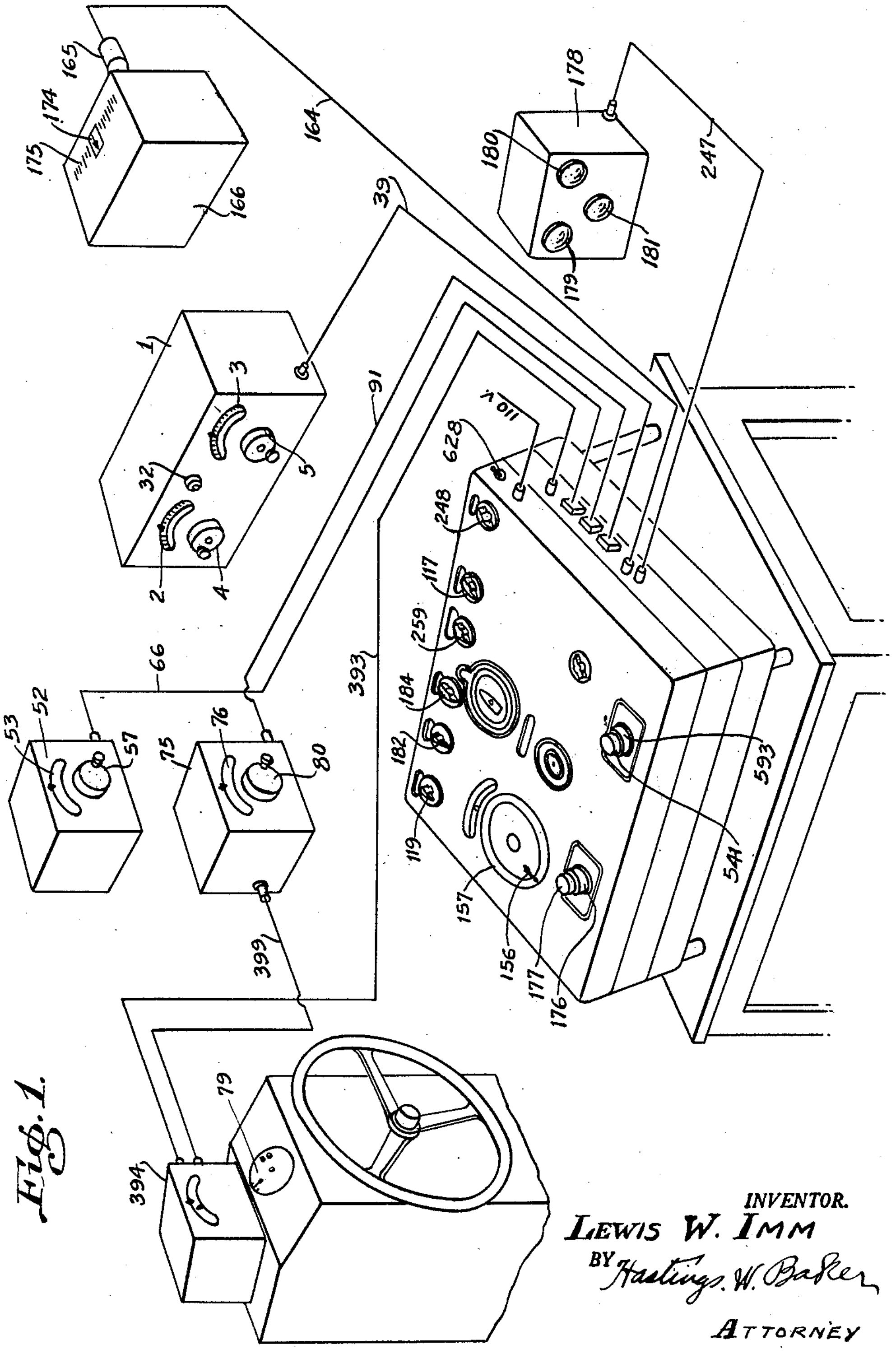
Figure 1 is a perspective view of the main computer and its associated parts.

The mean bearing splitter or computer 1 shown in Fig. 1 and Figs. 5 to 10 inclusive, is the unit which averages the left bearing cut-on and the right bearing cut-on of the target or submarine and this average bearing is transmitted to the main computer shown in Fig. 1. This bearing splitter may also be used to transmit single bearings to the main computer.

The casing of the mean bearing computer is provided with windows 2 and 3. Rotary input knobs 4 and 5 are secured to shafts 6 and 7 respectively, which are supported by the casing. The shaft 6 has secured thereto a pinion 8, which drives the gear 9 secured to shaft 10 carrying pinion 11, which drives gear 12 rotatively mounted on shaft 6. The gear 12 has secured thereto a dial 13, which has indicia thereon corresponding to the compass rose. In like manner the shaft 7 has secured thereto a pinion 14 which drives the gear 15 secured to shaft 16 carrying pinion 17, which drives gear 18 rotatively mounted on shaft 7. The gear 18 has secured thereto a dial 19, which also has indicia thereon corresponding to the compass rose. The gear 15 drives the gear 20 and the gear 9 drives the gear 21. The gears 20 and 21 form a part of a differential gearing, having its output connected to the shaft 22 so that the shaft 22 is actuated an amount corresponding to the mean of the values entered by knobs 4 and 5. The shaft 22 has a gear 23 secured thereto, which actuates the gear 24 on shaft 25 which drives the pinion 26 secured to shaft 27, which shaft carries a beveled pinion 28, which drives a pinion 29 secured to shaft 30 of synchro motor 31.

Figures 5, 7:
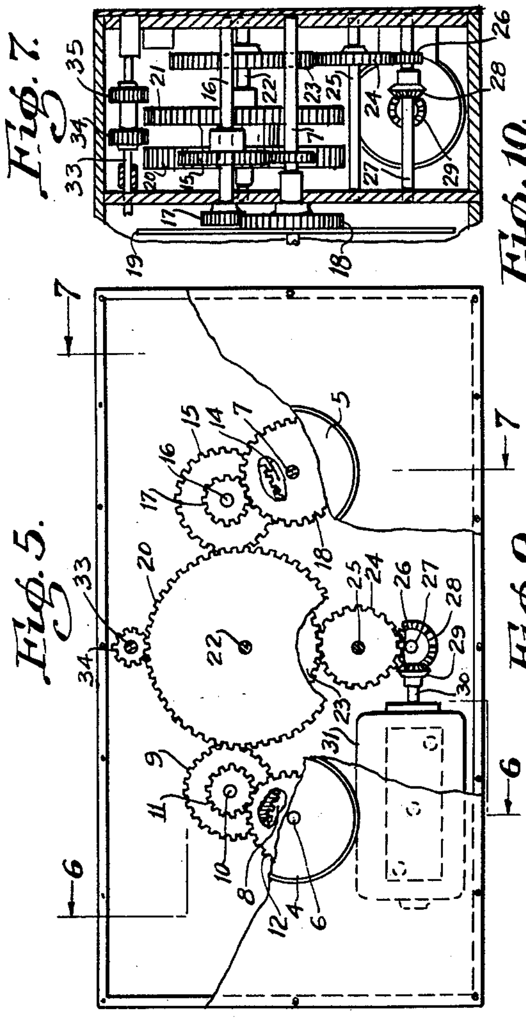
Figure 5 is the front elevational view of the mean bearing computer with the cover removed.
Figure 7 is a cross sectional view on the line 7—7 of Figure 5 looking in the direction of the arrows.
Figures 8, 9, 10:
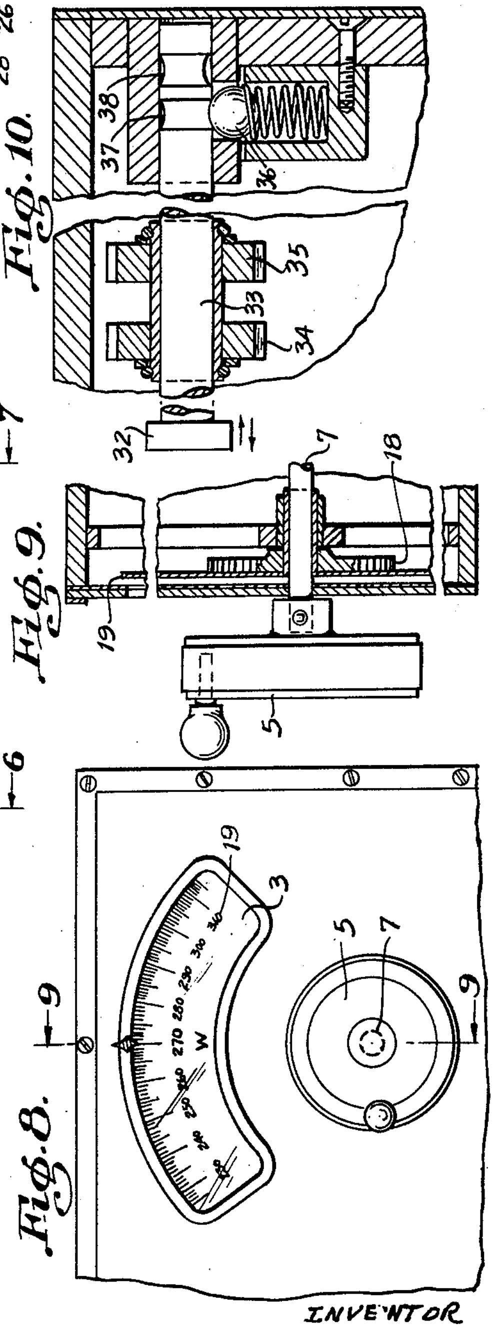
Figure 8 is an elevational view of the right-hand portion of the front of the mean bearing computer.
Figure 9 is a cross sectional view on the line 9—9 of Figure 8 looking in the direction of the arrows.
Figure 10 is an enlarged view, partly in cross section, of the uppermost shaft shown in Figure 7 and its associated parts.
Figure 6:
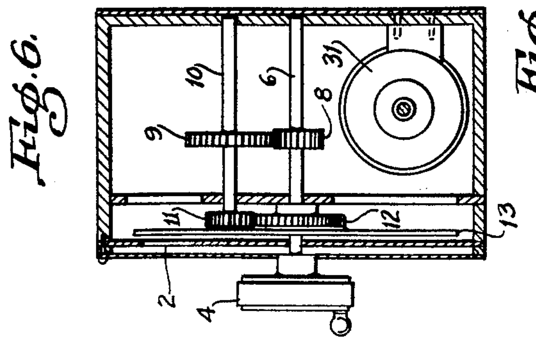
Figure 6 is a cross sectional view on the line 6—6 of Figure 5 looking in the direction of the arrows.
Figures 11, 12, 13, 14:
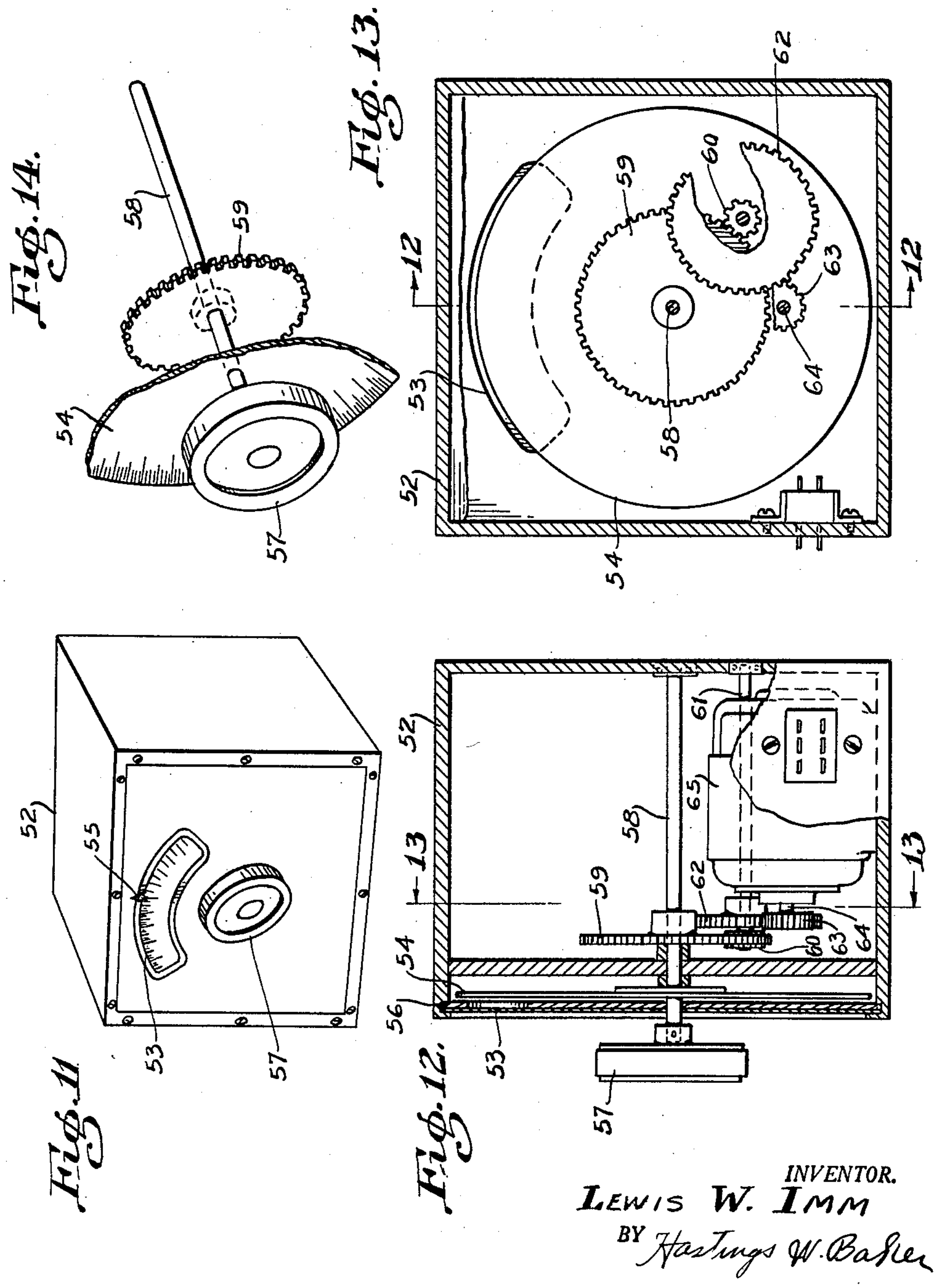
Figure 11 is a perspective view of the speed follower shown in Figure 1.
Figure 12 is a view, largely in cross section, on the line 12—12 of Figure 13.
Figure 13 is an elevational view, partly in cross section, on the line 13—13 of Figure 12, looking in the direction of the arrows.
Figure 14 is a perspective view of the central shaft shown in Figure 12, with the parts secured thereon.

If single bearings are to be used the button 32 is pulled out thereby moving the shaft 33 to the left as viewed in Figs. 7 and 10, so that the two gears 34 and 35, which are secured to shaft 33 mesh with gears 20 and 21 respectively, thereby causing gears 20 and 21 to rotate together, so that the full setting of either knob 4 or 5 may be transmitted to the motor 31 instead of the mean setting.

The shaft 33 is held in either of its positions by a spring pressed ball 36, being seated in either of grooves 37 or 38 in shaft 33. It is important that the operator should see that both dials 13 and 19 indicate the same value before he moves the gears 34 and 35, to mesh with the gears 20 and 21 respectively.

If average bearings are used the button 32 is pressed and the right bearing cut-on is entered by turning the knob 5 until the compass rose 19 indicates that particular bearing cut-on and the left bearing cut-on is indicated by turning the other knob 4 until the dial 13 indicates that particular bearing cut-on. The differential gearing now averages these two cut-ons. However, if single bearings are to be used, the differential gearing is virtually eliminated by moving the gears 34 and 35 into mesh with gears 20 and 21 respectively. This enables either knob to enter the correct bearing.

Figure 3:
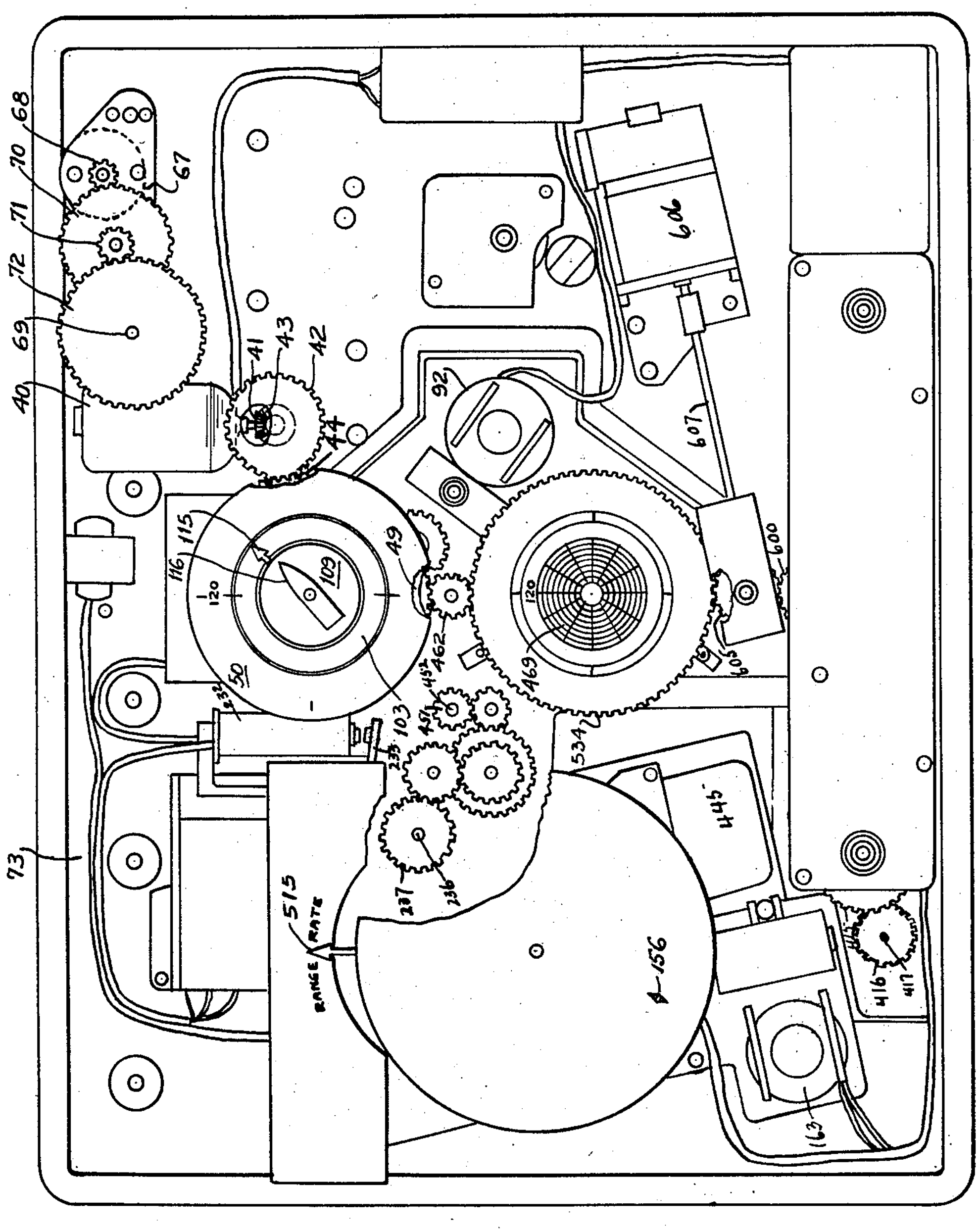
Figure 3 is a plan view of the main computer with the top plate removed.
Figures 36, 37:
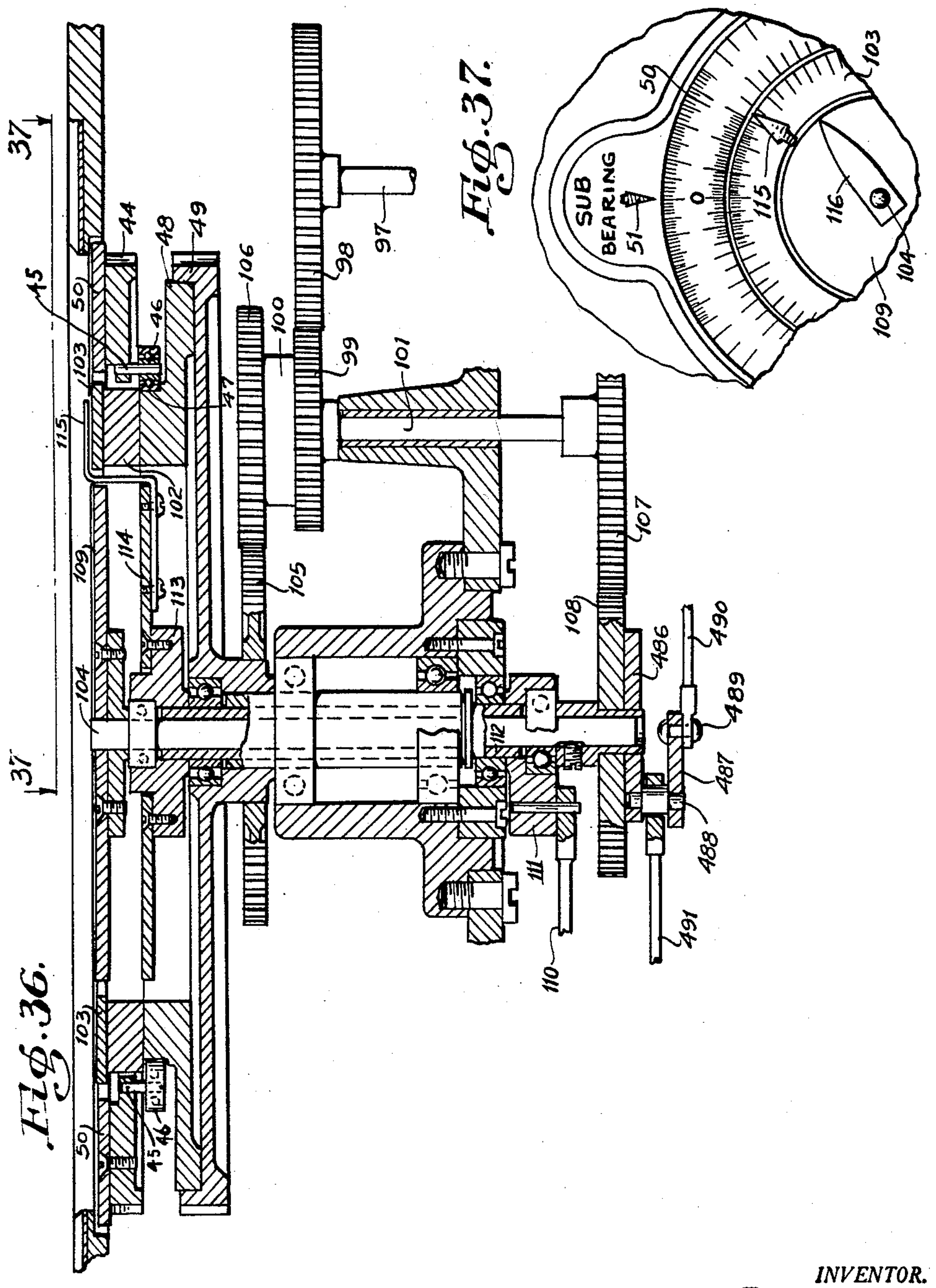
Figure 36 is a cross sectional view of the assembly showing the target bearing, own ships course and the course to steer indicators.
Figure 37 is a top plan view of the parts shown on line 37—37 of Figure 36.

The synchro motor 31 is connected by leads 39 to the synchro 40, Fig. 3 in the main computer, which synchro 40 drives shaft 41 which drives gear 42 through bevel gearing 43. The gear 42 drives gear 44, Figs. 3 and 36. The gear 44 carries three or more shafts 45 which are provided with rollers 46. The gear 44 is thus free to rotate relative to gear 49. The gear 44 is provided with a dial 50 having indicia thereon representing the compass rose. This dial 50 therefore, when read at the pointer 51 Fig. 2 and Fig. 37, shows the bearing of the submarine as received from the sound equipment of the destroyer. This sound equipment forms a part of the standard equipment of the destroyer and does not form a part of this invention so it is not shown herein. When the dial 50 has rotated to bring the proper reading in line with the pointer 51, we have, in effect, turned Figs. 47 and 48 so that the line representing the range R extends in the same up and down direction as the pointer 51, as shown in Fig. 2.

The speed follower 52, Figs. 1, 11, 12, 13 and 14, is mounted in a box having a window 53 through which is viewed the dial 54 having the numerals thereon representing knots. This dial should be read at the pointer 55. A transparent panel 56 is provided in front of the dial 54 so as to cover the front of the speed follower.

Figure 27:
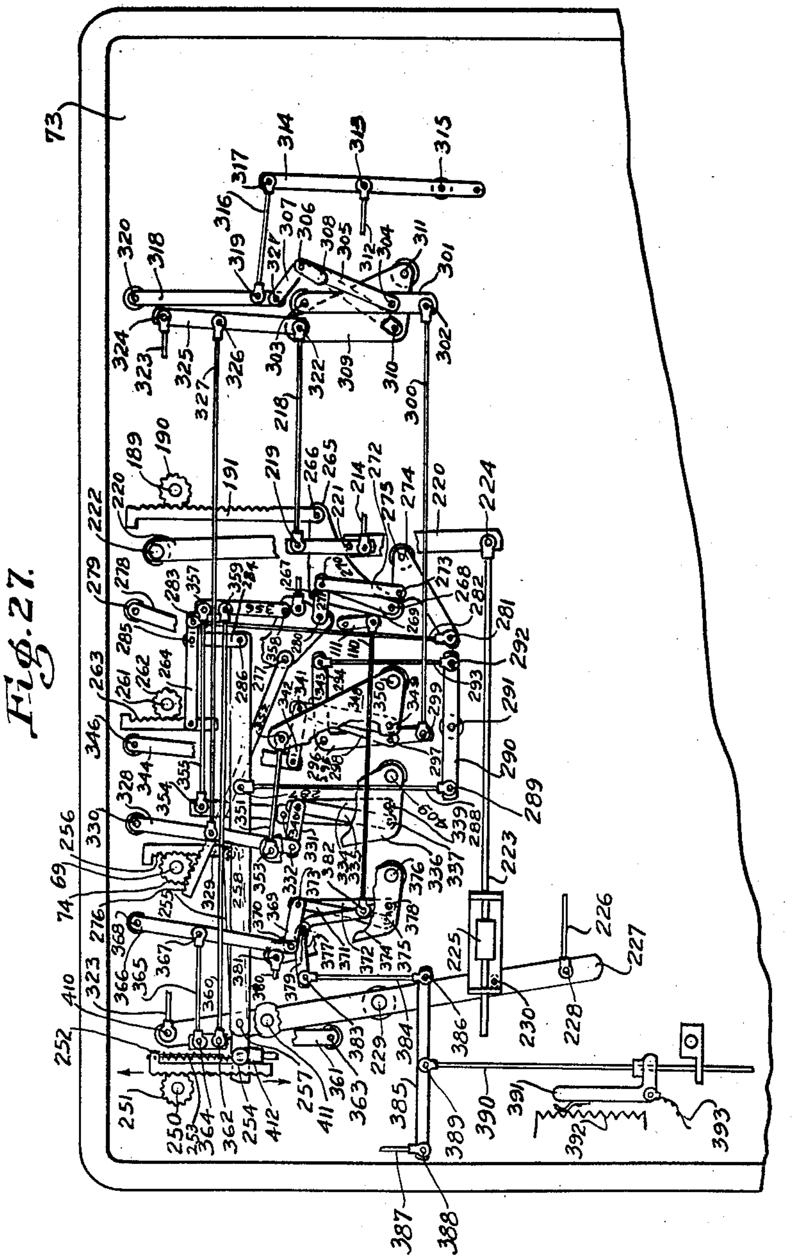
Figure 27 is a bottom plan view of all of the mechanism operated by the R*e* and the distance to dropping station knobs and a portion of the mechanism operated by the own ship speed, and the time lag knobs.
Figure 28:
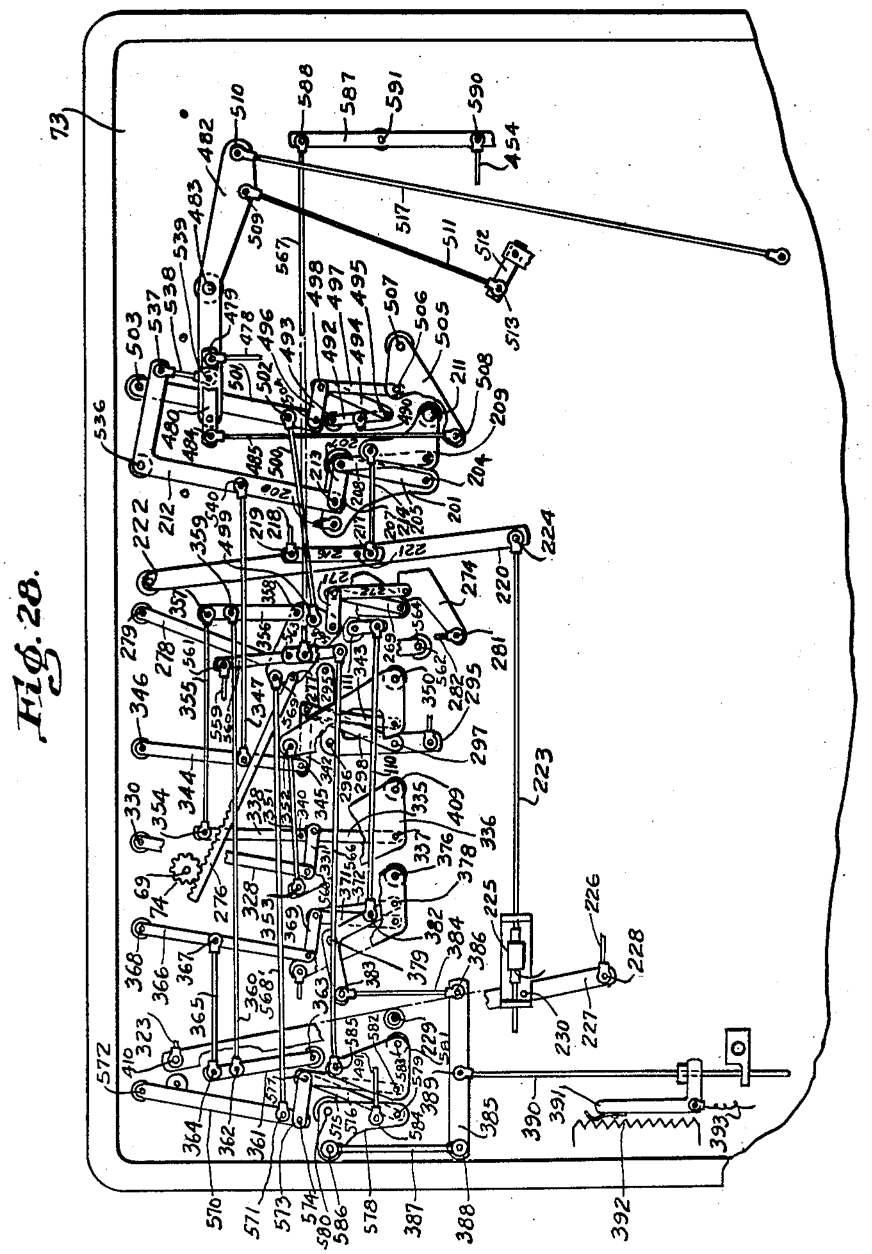
Figure 28 is a bottom plan view showing certain parts, in addition to those shown in Figure 27, which are operated by the own ship speed knob.

The operator reads the pitometer log of the destroyer and from its speed indication he rotates correspondingly the knob 57 which is secured to shaft 58 which also has secured thereto the dial 54. Shaft 58 also has gear 59 secured thereto which drives a pinion 60 secured to a shaft 61 to which is also secured a gear 62 which drives a pinion 63 secured to the shaft 64 of a synchro motor 65. This synchro motor 65 is connected by leads 66 (Fig. 1) to a synchro 67 (Fig. 3) which drives a pinion 68 which drives shaft 69 through gears 70, 71, and 72 (Fig. 3). The shaft 69 projects through the mechanism support panel 73 and on the other side of the said panel 73 from the above mentioned gearing, a pinion 74 is secured, as is shown in Figs. 27 and 28, which pinion therefore is rotated an amount corresponding to the speed of the destroyer, which speed is V*d*. The shaft 69 may also be actuated manually by rotating the knob 117 Fig. 2. There is also an indicator 118 behind the knob 117 so that the operator can adjust the input for "own ship speed" or when the shaft 69 is being adjusted by the speed follower 52, the operator can read on the dial 118 what is the speed.

The compass follower 75 (Figs. 1, 15, 16, and 17) is provided with a window 76 through which a dial 77 may be read relative to a pointer 78. The operator will take the reading from the compass 79 and will rotate the knob 80 a sufficient amount so that the dial 77 will indicate at the position of the pointer 78 the reading of the compass. The knob 80 is secured to a shaft 81 Figs. 16 and 17), which has secured thereto gears 82 and 83. The gear 82 drives a gear 84 secured to shaft 85 carrying pinion 86 which drives gear 87. Dial 77 is secured to the gear 87. By the above means the dial is rotated so that the compass reading will appear immediately below the pointer 78.

Figure 4:
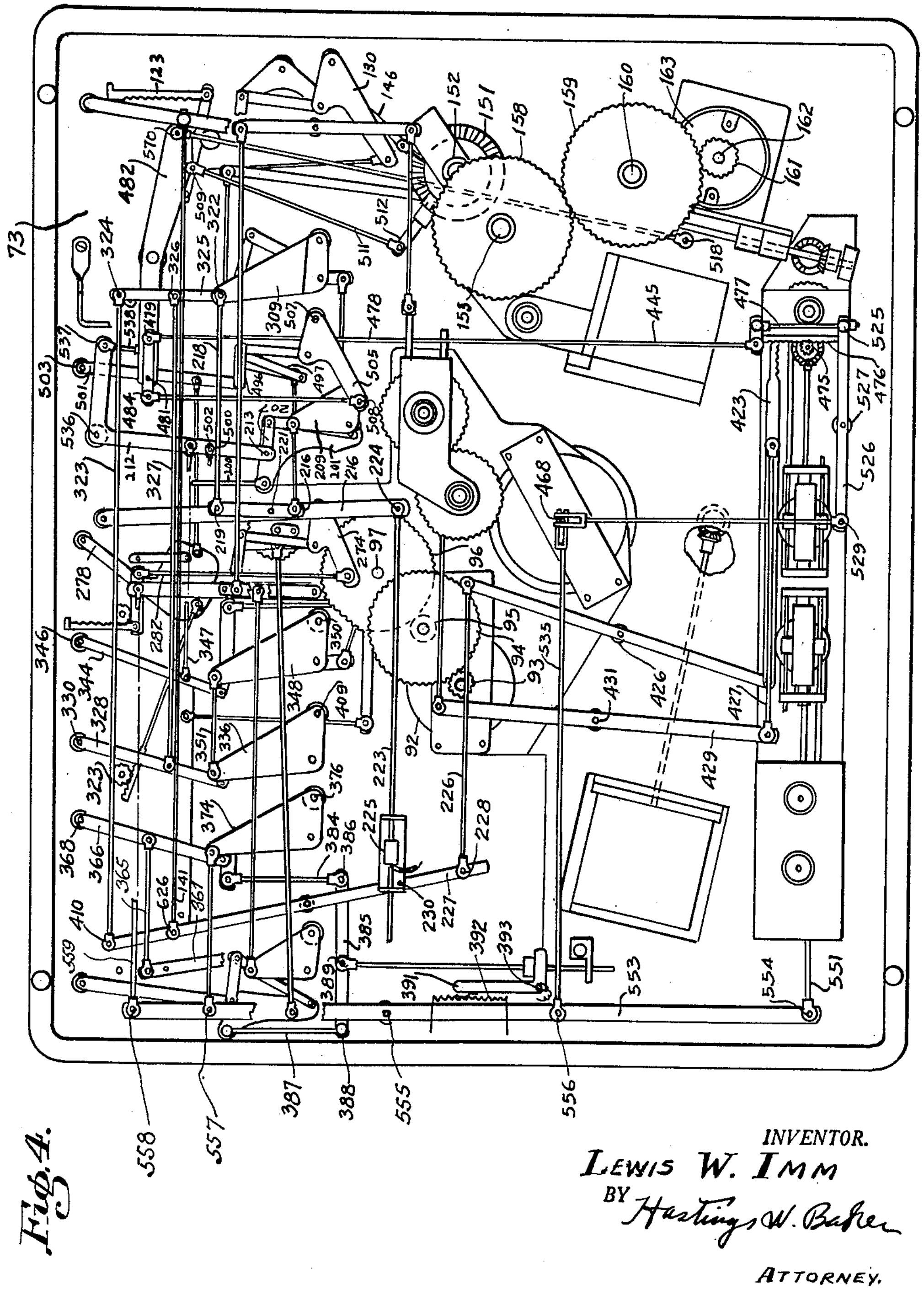
Figure 4 is a view of the bottom of the main computer with the cover plate removed, and with some parts omitted for the sake of clarity.

The gear 83 drives a pinion 88 secured to the shaft 89 of the synchro motor 90 (Figs. 16 and 17), which motor is connected by leads 91 (Fig. 1) to synchro 92 in the main computer (see Figs. 3 and 4). The synchro 92 drives a pinion 93 (Fig. 4) which drives a gear 94, pinion 95, and gear 96, which gear 96 is secured to shaft 97 as shown in Fig. 4, which shaft 97 extends through the main panel 73 and its other end carries gear 98 (Fig. 36), which drives a gear 99 of a differential mechanism 100, which has its output secured to the shaft

101. This gear 99 therefore is rotated an amount corresponding to angle *j*.

As will hereinafter be explained, the gear 49 (Fig. 36) is rotated an amount corresponding to the varying value of the angle *e*. As heretofore explained, this gear 49 has an annular member 48 secured thereto. This annular member 48 has a ring 102 attached thereto so as to form with the annular member 48 the groove 47. Attached to the ring 102 is a ring dial 103, which ring dial therefore rotates an amount corresponding to the value of the angle *e*.

The gear 49 is rotatably mounted on the shaft 104 and has secured thereto a gear 105 which drives a gear 106. The gears 99 and 106 form the input gears of the differential mechanism 100, the shaft 101 rotating an amount corresponding to the difference between the angles *e* and *j*, which difference is the angle *p*.

The shaft 101 drives a gear 107 which drives a gear 108 secured to the shaft 104. A disc 109 is secured to said shaft 104.

As will hereinafter be described, a wire or push rod 110 is connected to an arm 111 secured to sleeve 112 carrying a boss 113 to which is secured a disc 114 which forms a support for a course to steer pointer 115 which is bent so as to pass between the disc 109 and the ring dial 103 as is shown in Fig. 36. Wire 110, as will hereinafter be described, moves an amount corresponding to sin *b* and by the arm 111 the sin value is converted so that the pointer 115 moves an amount corresponding to the value of the angle *b*.

In Fig. 37 the indicia of dial 50 indicates at the pointer 51 the bearing of the submarine as received through the sound projector system and as transmitted through the mean bearing computer I (Fig. 1) and received on the dial 50. In said figure, the indicia of ring dial 103 indicates at pointer 51 the computer generated submarine bearing which is the angle *e*. The destroyer course pointer 116, which is etched into disc 109, indicates on the indicia of the ring dial 103 the course that the destroyer is following which conforms to the angle *j*. The angle formed by a line through the pointer 51 and the center of shaft 104, and the line formed by the tip of the destroyer course pointer 116 and the shaft 104 is equal to the angle *p* of Fig. 47. The course to steer pointer 115 indicates on the indicia of ring dial 103 the course which the destroyer should follow to intercept the submarine. The difference between the course of pointer 115 and the destroyer course pointer 116 indicates the change in course which the destroyer must assume in order to get on the correct course to intercept the submarine, that is, it indicates the difference of value between the angles *p* and *b*. When the destroyer is on the proper attack course this difference will, of course, be zero. There is, therefore, a course to steer pointer 115 which indicates the calculated value of the angle *b* as obtained from the calculated value of sin *b*.

In Formula #8 it is indicated that sin *b* is being calculated whereas the angle *p* is being employed in the actual mechanism of the computer; that is in Formula #8 where the value cos *b* is indicated as being used, it is in fact the value cos *p*. However, this is not serious for the angle *p* is being constantly corrected by changing the course of the destroyer in an attempt to place the destroyer on the proper attack course, and the more nearly this result is obtained, the more nearly the angle *p* approaches the value of angle *b*, so that when the angle *p* equals the angle *b* then the course to steer pointer 115 will indicate the exact value of angle *b*.

In addition to the power line input, the main computer has only three electrical inputs which are the inputs from the mean computer 1, the speed follower 52, and the compass follower 75, all of which have heretofore been described. As will hereinafter be described, the range recorder and the firing signal indicator are controlled by the main computer and the course to steer indicator is jointly controlled by the compass follower and the main computer.

The main computer has various manual inputs in addition to the manual input 117 heretofore described in regard to "own ship speed."

As shown in Fig. 2, a knob 119 is rotatable in conjunction with a scale 120 which is calibrated to show a square of the amount of rotation of the knob 119; that is, unit indications would become much further apart as the knob is progressively rotated clockwise. This scale represents the depth of the submarine in feet, and will therefore correspond to the line BC of Fig. 46. The knob 119 is secured to a shaft 121, Figs. 2 and 25, which is provided with a pinion 122 which drives a rack 123. This rack would be actuated an amount corresponding to the value of $D^2$ of Formula #2. The rack 123 at its lower end is connected to a lever 124 by means of a pin 125 which lever is mounted on a fixed pivot 126. The lever 124 carries a pin 127 on which is hung a link 128 connected by pin 129 to a lever 130 mounted on a fixed pivot 131. The lever 130 carries a pin 132 connected to a link 133 which link is connected at its upper end to links 134 and 135 by means of a pin 136. The link 134 is connected to a lever 137 by means of a pin 138. The lever 137 is mounted on a fixed pivot 139 and carries a pin 140 intermediate its length to which is connected a rod 141. As will hereinafter be explained, the rod 141 is actuated by means of a lever 227 through pin 626, Fig. 29 an amount corresponding to the value of the horizontal range R and by being connected to the lever 137 intermediate its length the value R is changed to 2.38R. The lower end of the link 135 carries a pin 142 carried by a lever 143 which has a fixed pivot 144. The lever 143 carries a pin 145 to which is connected a rod 146.

The parts 130, 133, 134, 135 and 143 constitute a division mechanism. The input of this division mechanism from the rack 123 is $D^2$ and the input from the rod 141 is 2.38R so that the resultant movement of the output rod 146 is $$\frac{D^2}{2.38R}$$

which, according to Formula #2, is $cR_s$. This value is transmitted to rack 147 by means of a pin 148. The rack 147 drives a pinion 149 constituting one input of a differential 150. The other input of the differential 150 is a gear 151 which, as will hereinafter be described, is rotated an amount corresponding to the value of horizontal range R. Of course, both of the inputs to this differential mechanism are in circular motion. The shaft 152 constitutes the output of the differential mechanism 150, the differential mechanism serving the function of adding the value R introduced through the gear 151 to the value of $cR_s$ introduced by means of the pinion 149 so that the shaft 152 rotates an amount corresponding to $R+cR_s$ which is the value of slant range $R_s$ in accordance with Formula #1.

Figure 25:
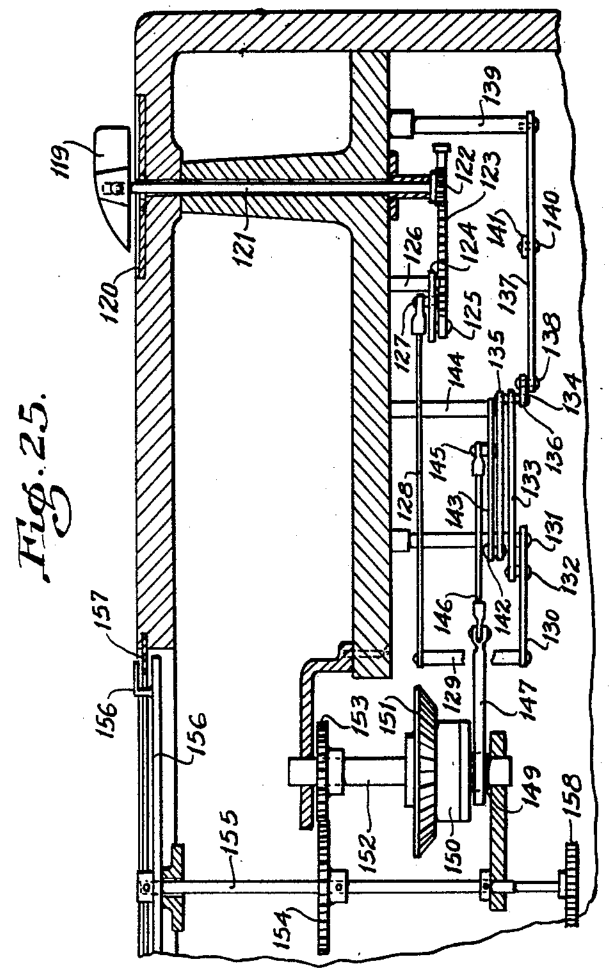
Figure 25 is a side view of the mechanism shown in Figure 24 and taken on the line 25—25 thereof.
Figure 24:
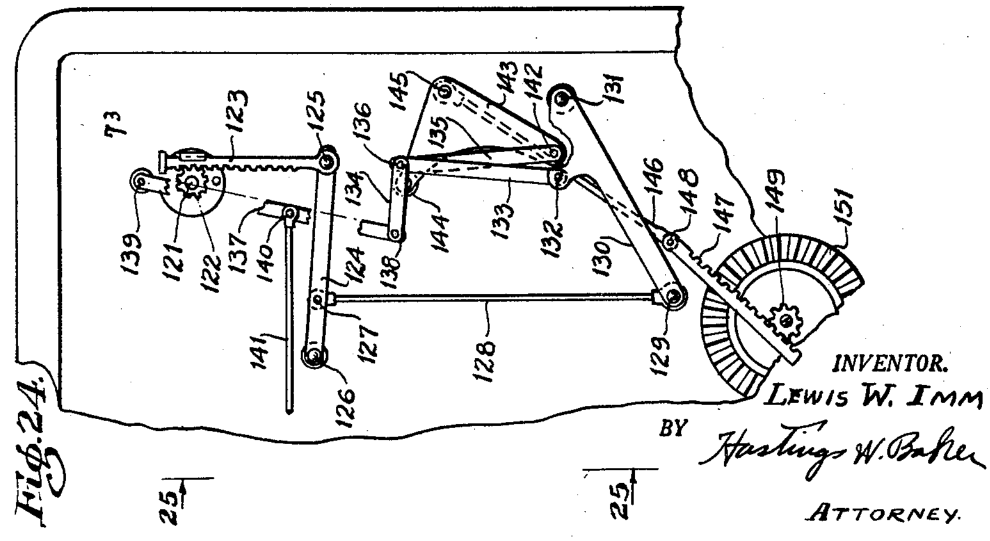
Figure 24 is a bottom plan view of a portion of the mechanism operated by the actuation of the submarine depth knob.

A gear 153 is secured to the shaft 152 and drives a gear 154 secured to the shaft 155 which carries a pointer 156, Figs. 2 and 25. This pointer 156 moves over a scale 157 which is calibrated in units of slant range.

Figure 22:
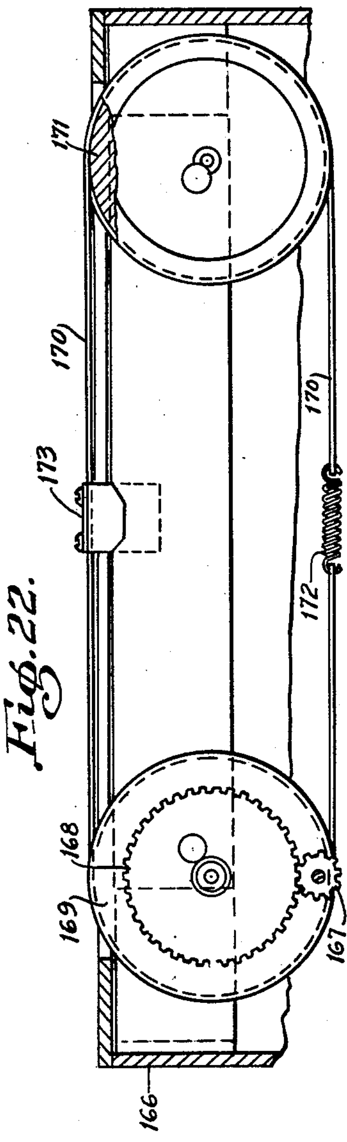
Figure 22 is a plan view, largely in cross section, of the slant range indicator assembly used in the range recorder shown in Figure 1, and taken on the line 22—22 of Figure 23.
Figure 23:
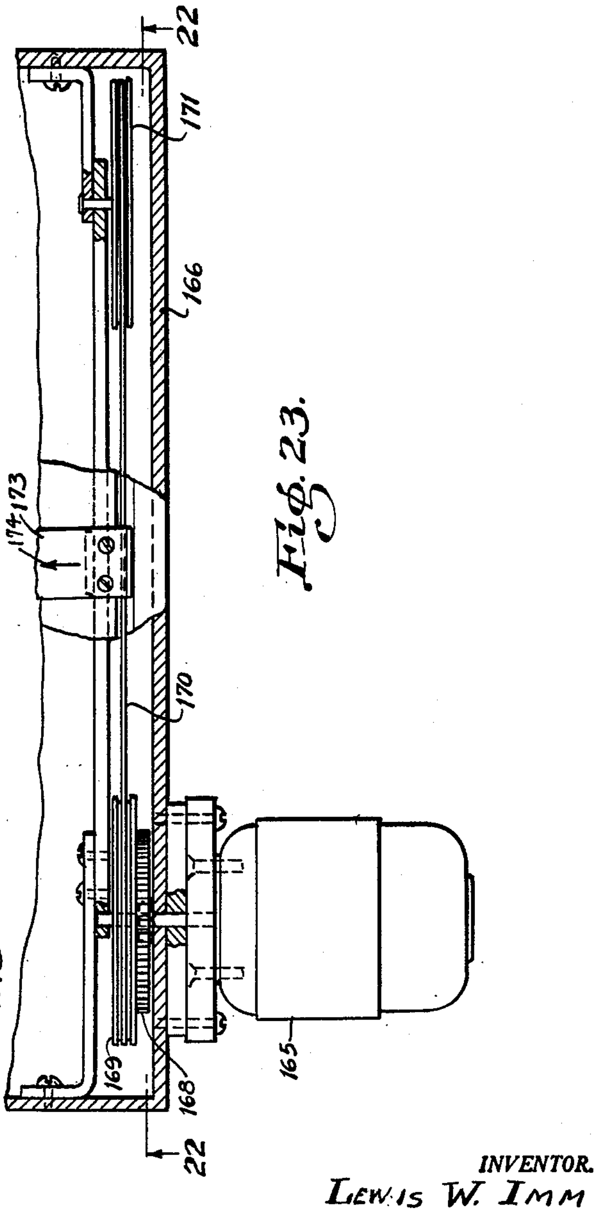
Figure 23 is an elevational view of the said indicator assembly.

The shaft 155, Fig. 25, carries a gear 158, Figs. 4 and 25, which gear drives a gear 159 mounted on shaft 160, which gear 159 drives a pinion 161 secured to shaft 162 on which is mounted a synchro motor 163 which is operatively connected by lead 164, Fig. 1, to a synchro motor 165 of the range recorder 166, shown in Figs. 1, 22 and 23. The synchro motor 165 drives a pinion 167, Fig. 22 in the range recorder which pinion drives a gear 168 to which is affixed a pulley 169 having a groove to receive a wire or belt 170 which is also trained over an idler pulley 171, the wire 170 being maintained under tension by means of a spring 172 connecting its ends. The wire or belt 170 carries a plate 173 on which is a pointer 174 which is movable beneath a transparent scale 175, Fig. 1 on the top of the range recorder, which scale is calibrated in units to represent slant range $R_s$.

The range recorder 166 is installed in the destroyer so as to be convenient to the operator who is receiving the range from the sound gear which shows the range of the submarine at any given instant. If the range, as received from the sound gear, which sound gear forms no part of this invention and is standard equipment on the destroyer, is not in agreement with the range shown on the range recorder 166, the operator would rotate knob 176, as will be hereinafter described, so as to move the pointer 174 to indicate the same range as received by the sound gear. This, of course, would be necessary at the beginning of an operation and perhaps several adjustments would have to be made thereafter until the attack director had been adjusted so as to show the range at that instant and so that the attack director would vary that range as the range varied. The knob 176 enters the range and the knob 177 enters the range rate, where these values are entered manually, as will hereinafter be described.

As heretofore explained in connection with Fig. 47, the proper course to attack the submarine should be along the line AJ while the submarine travels along the course from B to J, with the range constantly varying. For instance, when the destroyer has proceeded to some intermediate point along the line AJ and the submarine proceeded to some intermediate point along the line BJ, the range would be much less than what is indicated in Fig. 47 as the distance AB. As this range decreases we approach closer and closer to the position in which the destroyer should fire its depth charge. Obviously, some warning should be given to the operator that he is approaching this position. In the preferred construction there is provided a time to fire indicator 178 which is provided with lights. For instance, light 179 flashes on thirty seconds before the charge should be fired, while the light 180 flashes on fifteen seconds before the charge should be thrown, and the light 181 flashes on at the instant that the charge should be fired. These lights, therefore, warn the operator to get ready to fire and show him the instant that he should fire. Obviously, I do not limit myself to the idea of lighting the light 179 thirty seconds before firing or the light 180 fifteen seconds before the time to fire. I have simply found that these intervals are convenient.

In Fig. 47 we have assumed that the destroyer is at the point A and the submarine is at the point B so that the distance or range between them is R. As the destroyer adjusts its course so as to follow the line AJ and the submarine follows the line BJ, this range decreases and thirty seconds before the time to fire it would be at some value less than R. If, therefore, we would calculate the value of R at thirty seconds before time to fire and would actuate a contact leading to the light 179 when range was at that value, obviously the light 179 would be illuminated thirty seconds before time to fire. Furthermore, this contact might be closed if we provided one contact member on a movable member which is largely preset to the value of R at thirty seconds before firing time and would mount the other contact member on a movable member which was not preset but which would move in accordance with the varying value of range. This contact would be closed thirty seconds before firing time or, as otherwise expressed, it would be closed when the range has decreased to that value it would have thirty seconds before firing time.

Figure 26:
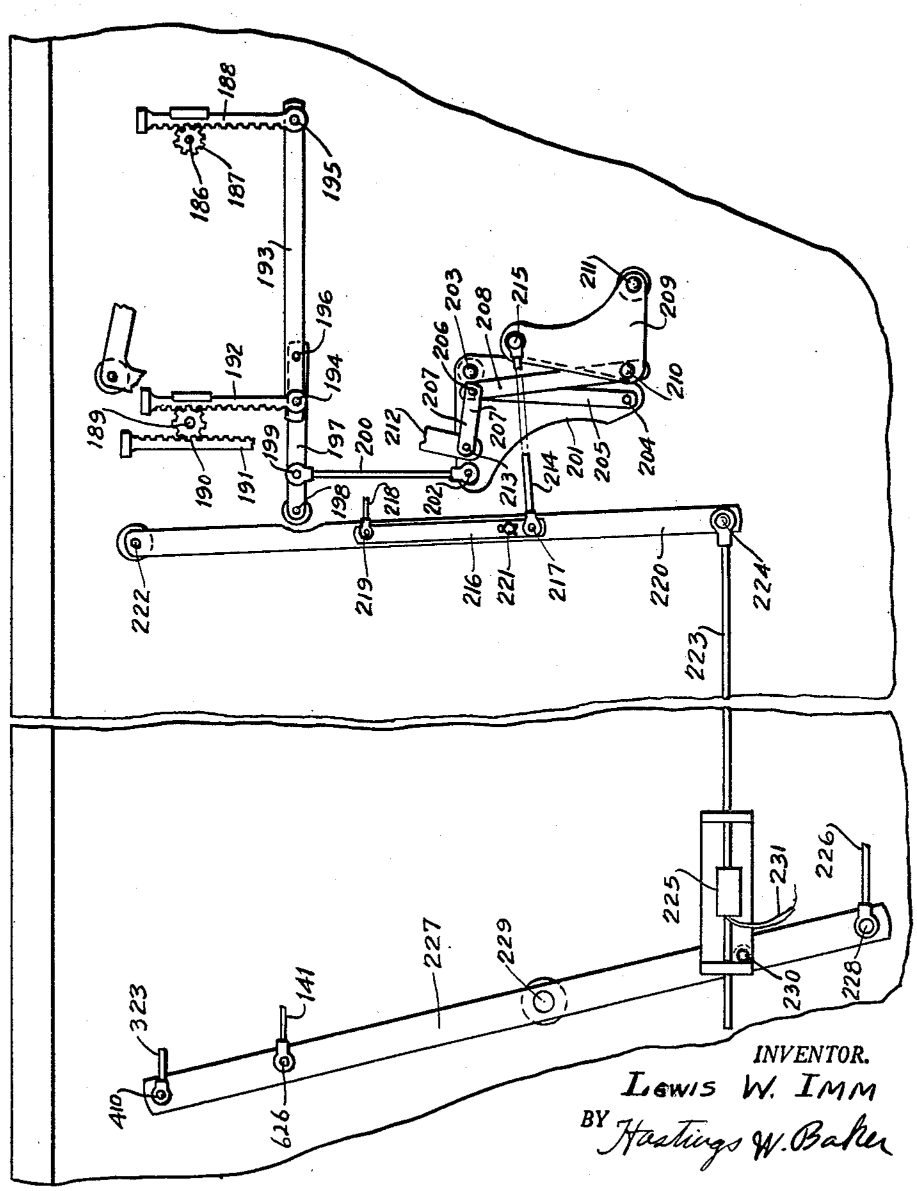
Figure 26 is a bottom plan view of the parts interposed between the time lag and dead time knobs and the microswitch to control the time to fire timing mechanism.

Such a structure is provided. In Fig. 2, I show a dead time knob 182 movable in front of a dead time scale 183 which is graduated to show the dead time in seconds. I also have a knob 184 to show the time lag on a scale 185 which is graduated in seconds. The time lag is the sum of sinking time plus time of flight of the charge. The knob 182 is secured to a shaft 186 which shaft is provided with a pinion 187, as shown in Fig. 26. The pinion 187 drives a rack 188, the position of the rack 188 being set so that at its lowest value it represents thirty seconds before firing time or the number of seconds before firing time at which we desire to operate light 179. The movement of the rack 188 will be the sum of the dead time, W, plus the time remaining until the instant to fire, T, which in the instance given is thirty seconds.

The time lag knob 184 is secured to a shaft 189, Figs. 2 and 26, which shaft 189 carries a pinion 190 which drives two racks 191 and 192. Each of these racks, therefore, moves the sum of the sinking time, S, and the time of flight, F.

The rack 191 drives a portion of the mechanism shown in Fig. 27, which will hereinafter be described. The rack 192 at its lower end is connected to a lever 193 by means of a pin 194 and the rack 188 is secured to the other end of the lever 193 by means of a pin 195. The lever 193 is provided with a pin 196 intermediate its ends, which pin 196 therefore moves an amount corresponding to the sum of $T+W+F+S$, which values are used in connection with Formula #10. The pin 196 connects the lever 193 to one end of a lever 197, which is pivoted on a fixed pivot 198. The lever 197 carries a pin 199 on which is hung a rod 200, which is connected to a lever 201 by means of a pin 202. The lever 201 is pivoted on a fixed pivot 203. The lever 201 carries a pin 204 on which is mounted a link 205 which at its other end is provided with a pin 206 which connects the link 205 to a link 207 and a link 208. The lower end of the link 208 is connected to a lever 209 by means of a pin 210, the lever 209 being mounted on a fixed pivot 211. The link 207 is connected to a lever 212 by means of a pin 213. As will hereinafter be described in connection with Fig. 28, the pin 213 serves as one input to enter the value of $$\frac{dR}{dt}$$

into the multiplying linkage 205, 208, and 209. The other input to the multiplying linkage is through the rod 200 and pin 202, which pin 202 enters the value of $T+W+F+S$, which movement is communicated from the addition lever 193. This multiplying linkage multiplies together these two input values and the product is transmitted to the rod 214 by means of a pin 215. The rod 214 is connected to an addition lever 216 by means of a pin 217. The other end of the lever 216 is connected to a rod 218 by means of a pin 219. As will hereinafter be described in connection with Fig. 27, the rod 218 is moved an amount corresponding to the value $K \cos p$. The lever 216 is pivoted to a lever 220 by means of a pin 221, the lever 220 being mounted on a fixed pivot 222. The lever 216 therefore adds together the value $K \cos p$, which value is entered through pin 219, and the value $$(T+W+F+S)\frac{dR}{dt}$$

which, according to Formula #10, is the value of R when $b$ equals $p$ as heretofore explained and this value of R is transmitted through the lever 220 to the rod 223 by means of a pin 224. The rod 223 serves as an actuating means for a micro switch 225.

An actuating rod 226 is connected to a lever 227 by means of a pin 228. The lever 227 is mounted on a fixed pivot 229 and carries the micro switch 225 to which it is pivoted by means of a pivot pin 230. As will hereinafter be described, the actuating rod 226 moves the micro switch 225 an amount corresponding to the range R. The movement of the rod 223 is largely preset so as to show the value of R at thirty seconds before firing time. True, it receives some movement which is not preset through the rod 218 and the link 207 but these movements are small in comparison with the movement communicated by the presetting mechanism of the knobs. The lever 227, however, is not preset. The movement which it would impart to the pivot pin 230 of the micro switch would be large as compared with the movement of the rod 223 after it was preset. However, the movement of the pin 230 and the movement of the rod 223 would be such that the micro switch would be closed when the range had decreased to the correct range at thirty seconds before firing.

Micro switch 225 is connected by a lead 231 to a solenoid 232, Fig. 41, which solenoid, when actuated, moves a lever 233 mounted on a pivot pin 234 so as to close a clutch 235.

A shaft 236 (Figs. 3 and 41) is continually driven by a gear 237, which shaft 236 drives a bevel pinion 238 which drives a bevel pinion 239 to which the clutch member 240 is secured. The other clutch member 241 is secured to a shaft 242 so that when the clutch member is operated by the solenoid, the shaft 242 rotates with shaft 236, but the shaft 242 remains stationary until the circuit to the solenoid is completed by the closing of the micro switch 225. The shaft 242 is provided with a plurality of cams 243, as shown in Fig. 41.

The shaft 242 rotates very slowly such as perhaps one revolution in a minute and a half. Each of the cams actuates a switch contact arm 244 which operates a plunger 245 of a micro switch 246. The cams are so disposed on the shaft 242 so as to close circuits successively leading to the lights 179, 180 and 181 respectively in the "time to fire" indicator. The leads are housed in one cable 247, as shown in Fig. 1. One of these cams would therefore close the circuit leading to the light 179 thirty seconds before time to fire, while another of the cams would close the circuit leading to the light 180 fifteen seconds before time to fire, and another cam would close the circuit leading to the light 181 at the time to fire. If it is desired to close these contacts at other times before the time to fire, all that would be necessary to do would be to change the position of the cams relative to the shaft 242. All of these lights might remain illuminated until after the time to fire whereupon another cam would cause all of the lights to be extinguished. A fifth cam is shown which may be used for any purpose desired such as, for instance, to inhibit a repetition of the operation of the light until the levers 220 and 227 have moved apart so that the micro switch 225 is not closed.

It will be remembered that in an ahead thrown attack the value K is calculated by one formula and in a stern attack it is calculated by another formula. As heretofore explained, the expression $Re+4.4Vd-L-Vd\ (S+F)$ contains all of the information that is necessary to calculate the value K for an ahead thrown attack or for a stern attack.

In Fig. 2 the value $Re$ may be entered by rotating the knob 248 relative to its scale 249. It will be noted that there is a zero position on this scale. The operator would rotate the knob 248 clockwise if he is making an ahead thrown attack but he would rotate it from its zero position to the line marked "stern attack" if he is going to make a stern attack. The knob 248 is secured on a shaft 250, Figs. 2 and 27, to which is secured a pinion 251 which meshes with a rack 252. The pinion 251 moves anti-clockwise when entering an increasing positive value for an ahead thrown attack and clockwise when the knob 248 is being moved from its zero position to its "stern attack" position. The rack 252 carries a rod 253 which passes through a slip member 254 carried by a lever 255, the rod 253 terminating in a stop 412, which normally touches the underside of the slip member 254.

It will be remembered that the speed follower, shown in Figs. 11 to 14 inclusive, drove a synchro 65 which drove a synchro 67, Fig. 3, and through the train of gears shown in the upper righthand portion of Fig. 3, the shaft 69 was driven an amount corresponding to the value *Vd*. This shaft 69 projects through the main support panel 73 and carries a pinion 74, as shown in Fig. 27, which pinion rotates anti-clockwise as the value *Vd* increases positively. The pinion 74 drives a rack 256 connected to the righthand end of lever 255. The lever 255 is connected by a pin 257 to a lever 258. The pin 257 is so positioned that its movement will correspond to the sum of the value $Re+4.4Vd$.

In Fig. 2 is shown a knob 259 which may be moved relative to its scale 260 to enter the value L which is the distance from the sound projector head to the dropping station, but this value is useful only in connection with a stern attack. This knob 259 is secured to a shaft 261 which projects through the main panel 73 and carries a pinion 262, as shown in Fig. 27. The pinion 262 rotates anti-clockwise to enter increasing positive values for L. It actuates a rack 263 connected to a lever 264.

It would be remembered in regard to the discussion of Fig. 26 that the pinion 190 enters the value $S+F$ which is sinking time plus time of flight, and this motion is transmitted to the rack 191, as shown in Figs. 26 and 27. The rack 191 is connected to a lever 265 by means of a pin 266. The lever 265 has a fixed pivot 267, and carries a pin 268 connected to a link 269, which link is connected at its upper end by means of a pin 270 to links 271 and 272. The link 272 is connected at its lower end by means of a pin 273 to a lever 274 mounted on a fixed pivot 275.

As above stated, the pinion 74 rotates an amount corresponding to the value of *Vd*. It drives a rack 276 connected by pin 277 to lever 278 mounted on a fixed pivot 279. The lever 278 is connected to the link 271 by means of a pin 280.

The linkage 271, 272, and 269, and the levers 265 and 274 constitute a multiplying mechanism to multiply the value *Vd* entered through link 271 by the value $S+F$ entered through lever 265, and this product is transmitted through the lever 274 to a pin 281 which connects the lever 274 to rod 282. The rod 282 is connected to the lever 264 by means of a pin 283. The lever 264 is connected to a link 284 by means of a pin 285. The lever 264 adds the value L entered through the pinion 262 to the value $Vd\ (S+F)$ which is introduced through the pin 283. The lower end of the link 284 is connected to the lever 258 by means of a pin 286. The lever 258 is connected by pin 287 to rod 288 which is connected by pin 289 to a lever 290 having a fixed pivot 291 which lever extends beyond the pivot and is connected by pin 292 to rod 293, which is connected by pin 294 to bell crank lever 295 having a fixed pivot 296. The lever 295 is provided with two outputs, one being the pin 297 on which is mounted a link 298 and the other being a pin 299 to which is connected a rod 300.

The lever 258 is a subtraction lever in that its lefthand end is elevated as increasing positive values are entered and its righthand end is lowered as increasing positive values are entered so that the pin 287 moves an amount corresponding to $Re+4.4Vd-L-Vd\ (S+F)$ which is the value of K according to Formula #7, and this value K is transmitted to the pins 297 and 299.

If an ahead thrown attack is to be made, the operator would rotate the knob 248 clockwise from its zero position so as to enter the proper value for *Re* and, of course, he would operate the manual input knobs to their proper positions, except that he would not rotate the knob 259 from its zero position because the value L is not used in an ahead thrown attack. The result is that the movement of the pin 287 is $Re+4.4Vd-Vd\ (F+S)$ in an ahead thrown attack.

In a stern dropped attack, however, the value L is important. Also, it is necessary to move the knob 248 anti-clockwise to the "stern attack" position, which movement depresses the rack 252. If the lefthand end of lever 255 were rigidly secured to rack 252, a negative value would be entered on the lever 255. This, however, is prevented by a fixed stop 411 mounted on the panel 73 below the pin 257, and in such a position so as to contact the lever 258 when the *Re* knob 248 and the knob 117 are at zero. When the *Re* knob 248 is then rotated to its "stern attack" position, the rack 252 moves downwardly, as viewed in Fig. 27 so that the stop 412 moves away from the slip member 254. In this case the pin 257 becomes a fixed pivot and will, therefore, impart no movement to lever 258 in case any of the knobs other than the *Re* knob are actuated. However, it will be remembered that it is the movement of the pin 257 which enters the value $Re+4.4Vd$, and since this movement is zero in a stern attack, the movement of pin 287 is $(L+VdS)$, the F of Formula #7 being disregarded in a stern dropped attack, because the time of flight when the charge is simply dropped overboard is substantially zero. In either a stern dropped attack or in an ahead thrown attack, therefore, the pin 287 moves an amount corresponding to K and, as above stated, this value K is transmitted to the pins 297 and 299.

The rod 300 is connected to a lever 301 by means of a pin 302, which lever 301 is mounted on a fixed pivot 303. The lever 301 carries a pin 304 on which is mounted a link 305. A pin 306 connects the link 305 to links 307 and 308. The link 308 is connected to a lever 309 by means of a pin 310, the lever 309 being mounted on a fixed pivot 311.

As will hereinafter be explained in connection with Fig. 30, a rod 312 is actuated an amount corresponding to the value cos *p*. It is connected by a pin 313 to a lever 314 having a fixed pivot 315. The upper end of this lever 314 is connected to a rod 316 by means of a pin 317. The other end of the rod 316 is connected to a lever 318 by means of a pin 319, the lever 318 having a fixed pivot 320. The lower end of the lever 318 is connected to the link 307 by means of a pin 321. The linkage 305, 307 and 308, and the levers 301 and 309 constitute a multiplying mechanism to multiply the value K entered through the lever 301 by the value cos *p* entered through link 307 so that the resultant movement given to the pin 322 carried by the lever 309 would be $K \cos p$.

Figure 29:
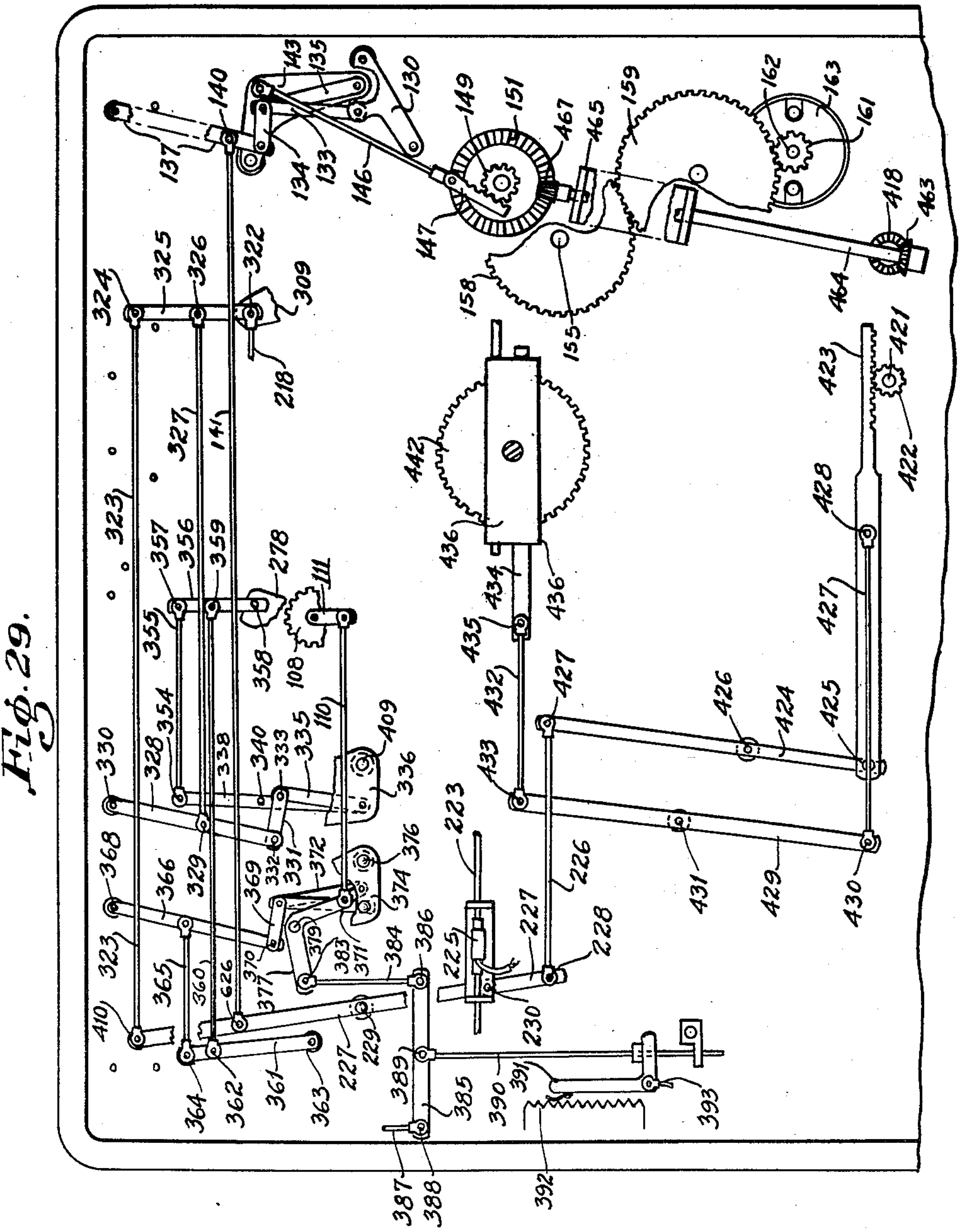
Figure 29 is a bottom plan view of a portion of the horizontal range mechanism.

The pin 322, Fig. 29, connects the lever 309 to the rod 218. It will be remembered in connection with the description of Fig. 26 that this rod 218 actuates one end of the lever 216 an amount $K \cos p$, which is one of the values used in calculating the value R, as heretofore described.

As heretofore described the lever 227 is actuated an amount corresponding to R. This lever 227 is connected to a rod 323 by means of a pin 410 and this rod is connected by pin 324 to a lever 325. A rod 327 is connected to the lever 325 by means of a pin 326. The lever 325 is a subtraction lever and the pin 326 therefore actuates the rod 327 an amount corresponding to $R-K \cos p$. The rod 327 is connected to a lever 328 by means of a pin 329, the lever 328 being mounted on a fixed pivot 330. The lower end of lever 328 is connected to a link 331 by means of a pin 332, Fig. 29. The link 331 is connected by a pin 333 to links 334 and 335. The link 335 is connected to a lever 336, Fig. 27, by means of a pin 337, while the link 334 is connected to the lower end of lever 338 by means of a pin 339. The lever 338 is mounted on a fixed pivot 340 and the lever 336 is mounted on a fixed pivot 409.

Figure 31:
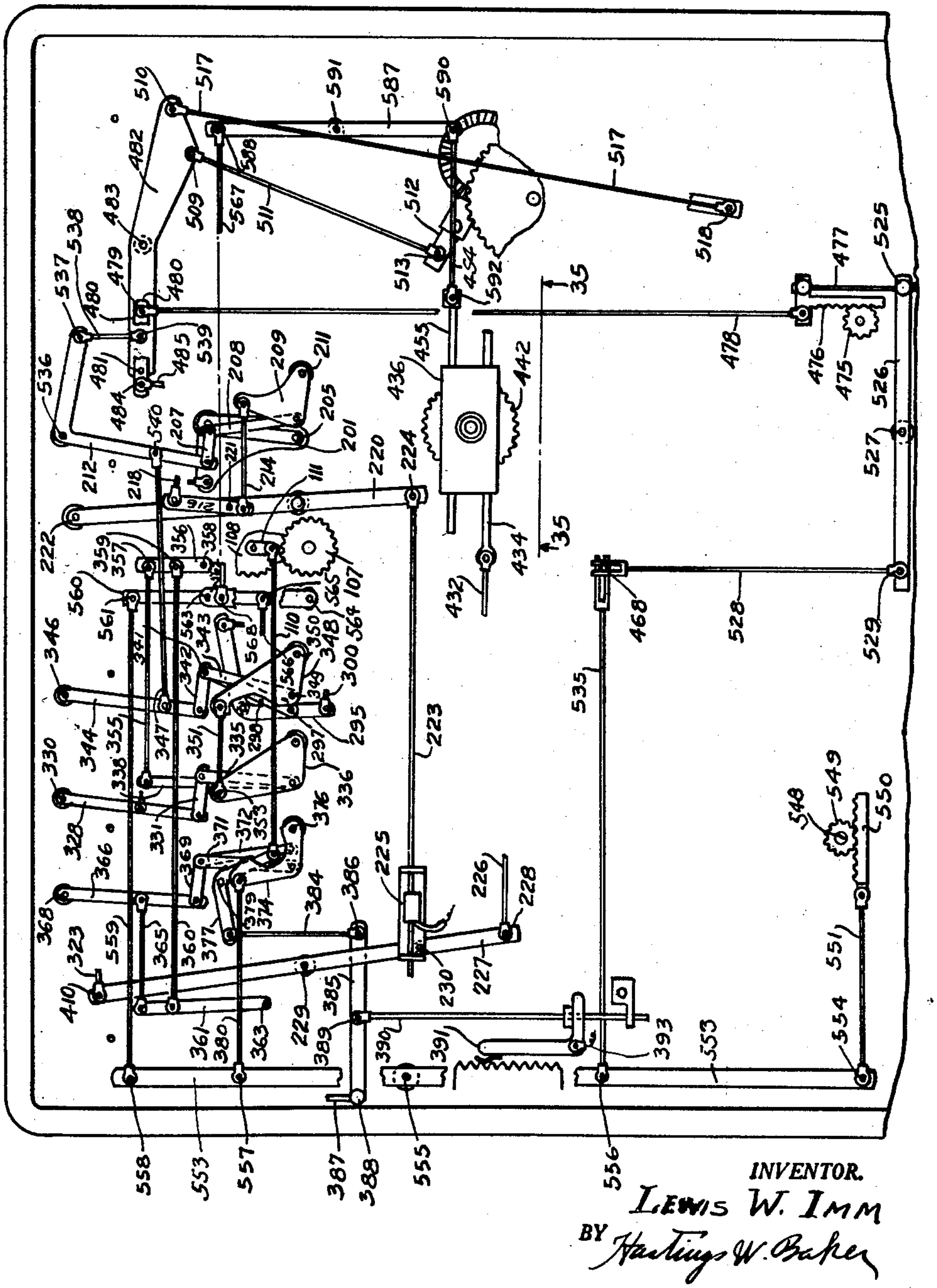
Figure 31 is a bottom plan view of a portion of the mechanism moved by the submarine components of speed along the line of sight and at right angles thereto.

It will be remembered that the pin 297, Figs. 28 and 31, actuates the link 298 an amount corresponding to the value K. This link 298 is connected by a pin 341 to a link 342 and to a link 343. The link 342 is connected to a lever 344, Fig. 28, by means of a pin 345, the lever 344 being mounted on a fixed pivot 346. As will be described in connection with Fig. 28, this lever 344 is actuated by a rod 347 which enters the value $dR \div dt$. The link 342 therefore enters the value $dR \div dt$ into the multiplying mechanism including the links 298 and 343, it being remembered that the link 298 enters a value K so that the multiplying mechanism multiplies these values together, securing an output value $$K\frac{dR}{dt}$$

The link 343, Fig. 27, is connected at its lower end to the lever 348 by means of a pin 349, the lever 348 having a fixed pivot 350. The output of the lever 348 is connected to the rod 351 by means of a pin 352. The rod 351 is connected to the lever 336 by a pin 353, the pin 353 therefore serving as an input to the division mechanism including links 331, 334, and 335, and this input value communicated to the lever 336 is $$K\frac{dR}{dt}$$

It will also be remembered that the input link 331 enters the value $R-K \cos p$. The lever 338 is the output for this division mechanism so that the pin 354, which connects the upper end of this lever to the rod 355, is actuated a value corresponding to $$\frac{K\frac{dR}{dt}}{R-K \cos p}$$

The rod 355 is connected to a lever 356 by means of a pin 357. The lower end of this lever 356, Fig. 27, is connected to the lever 278 by means of a pin 358. It will be remembered that the lever 278 is actuated by the rack 276 and pinion 74 which enters the value V*d*. The lever 356 is provided with a pin 359 connected to a rod 360. This lever 356 combines the two input values so that the rod 360 is moved an amount corresponding to $$Vd+\frac{K\frac{dR}{dt}}{R-K \cos p}$$

The rod 360 is connected to a lever 361 by means of a pin 362, the lever 361 being mounted on a fixed pivot 363. The upper end of lever 361 carries pin 364 connected to the rod 365 which is connected to the lever 366 by means of pin 367, the lever 366 being mounted on a fixed pivot 368. The lower end of lever 366 is connected to an input link 369 of a division mechanism by means of a pin 370. The link 369 is connected to links 371 and 372 by means of a pin 373. The link 371 is connected to a lever 374 by means of a pin 375, the lever 374 being mounted on a fixed pivot 376. The link 372 is connected to a bell crank lever 377 by means of pin 378. The bell crank lever 377 is mounted on a fixed pivot 379.

As will hereinafter be described in connection with Fig. 30, the rod 380 is connected to the upper end of lever 374 by means of a pin 381 and actuates this rod 380 an amount corresponding to $Vs \sin a$. This pin 381 is one input to the division mechanism which includes the links 369, 371 and 372, and the output to this division mechanism is the bell crank lever 377 which is therefore actuated an amount corresponding to $$\frac{Vs \sin a}{Vd+\frac{K\frac{dR}{dt}}{R-K \cos p}}$$

which is sin *b* according to Formula #8. The bell crank lever 377 is connected to the rod 110 by means of pin 382. It will be remembered in connection with the description of Fig. 36 that this rod 110, which moves an amount corresponding to sin *b*, is converted by the arm 111 so as to rotate the pointer 115 an amount corresponding to the value of the angle *b*, that is, so that the angle between the line extending from the pointer 51 and the center of shaft 104 and the line extending from the end of pointer 115 to the center of shaft 104 will be the angle *b*.

The bell crank lever 377 also carries at its other end pin 383 on which is suspended a rod 384 connected to a lever 385 by means of a pin 386.

As will hereinafter be described in connection with Fig. 30, there is a rod 387 which is actuated an amount corresponding to sin *p*. This rod 387 is connected to the other end of lever 385 by means of a pin 388. The lever 385 carries a pin 389 to which is connected a rod 390 to which is connected an arm 391, which engages a resistor 392 and therefore varies the current passing through a lead 393. It will be remembered that the pin 386 enters the value sin *b* on the lever 385 while the pin 388 enters the value sin *p*. When these two values are equal to each other, the arm 391 will be positioned relative to the resistor 392 so that no current will flow through the lead 393, but when angle *b* exceeds angle *p*, or vice versa, a current will flow. The lead 393 extends to the "course to steer" indicator 394, Fig. 19, in which is housed an ammeter having a needle 395 which will be positioned immediately below and point to a zero indicator 396 when no current is flowing, that is, when angle *b* equals angle *p*. This means that the destroyer is on its correct course and the helmsman will therefore know that he should not steer either to the port or starboard, and that he should hold his course. If, however, the ammeter needle 395 should extend to the right of the zero indicator 396, the helmsman would know to steer to starboard and if it would extend to the left of the zero indicator, he would know to steer to port. Since this information is desirable for the helmsman, the "course to steer" indicator is positioned directly above the compass or where the helmsman can readily see the indicator.

Figures 15, 16, 17:
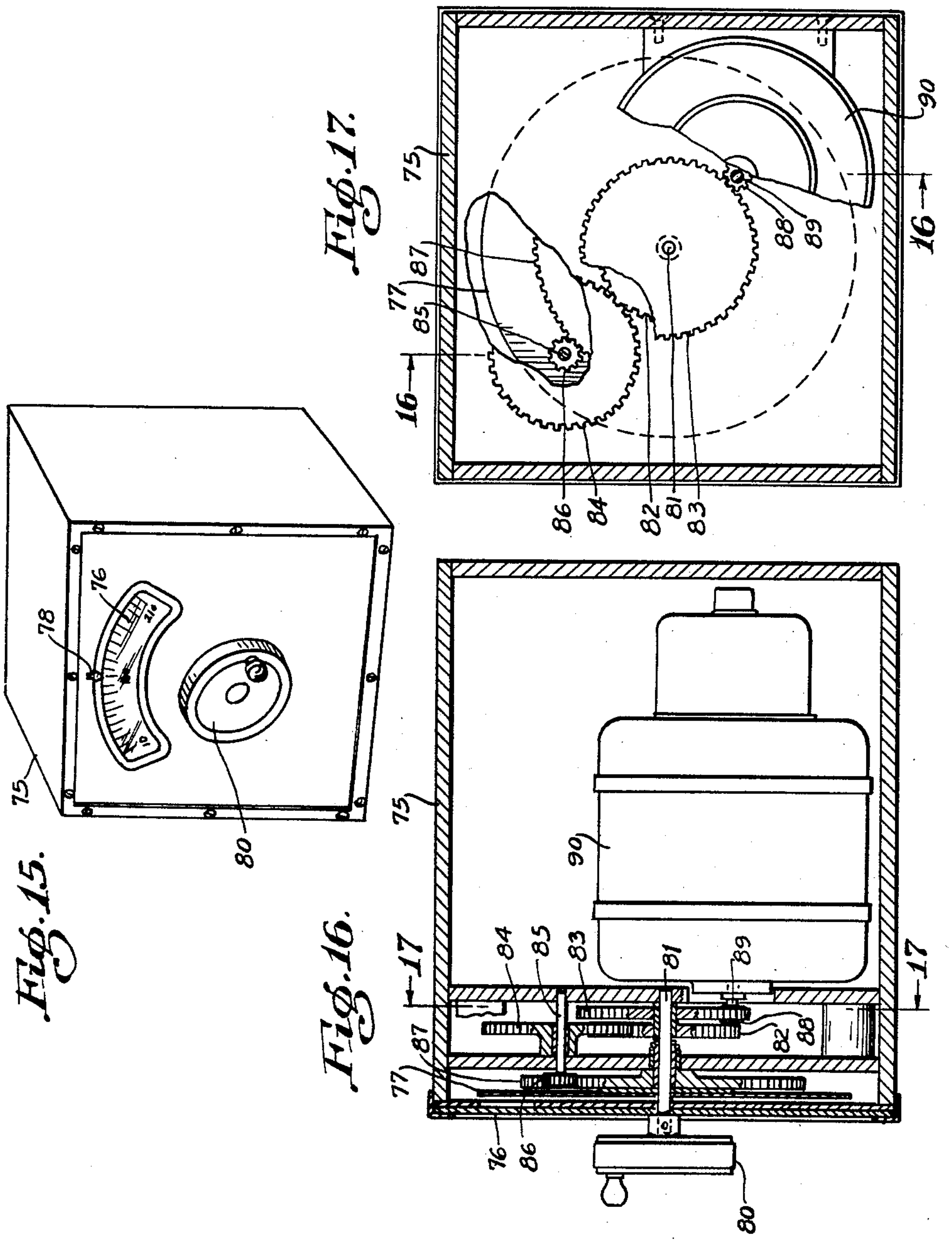
Figure 15 is a perspective view of the compass follow- shown in Figure 1.
Figure 16 is a view, largely in cross section, taken on the line 16—16 of Figure 17.
Figure 17 is an elevational view on the line 17—17 of Figure 16 looking in the direction of the arrows.
Figure 18:
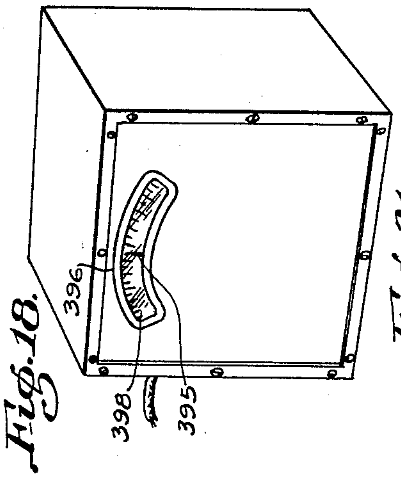
Figure 18 is a perspective view of the course to steer indicator assembly.
Figure 21:
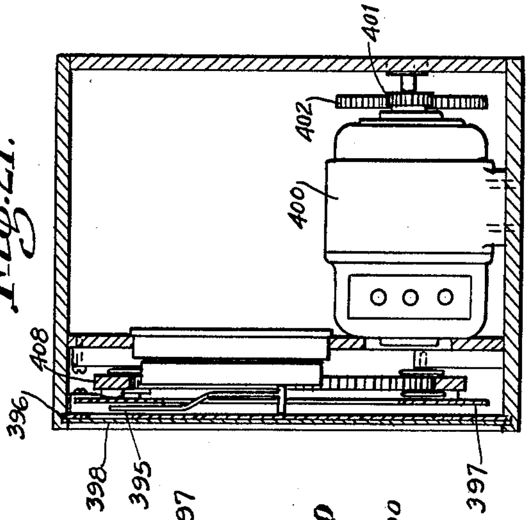
Figure 21 is a cross sectional view on the line 21—21 of Figure 19.
Figure 20:
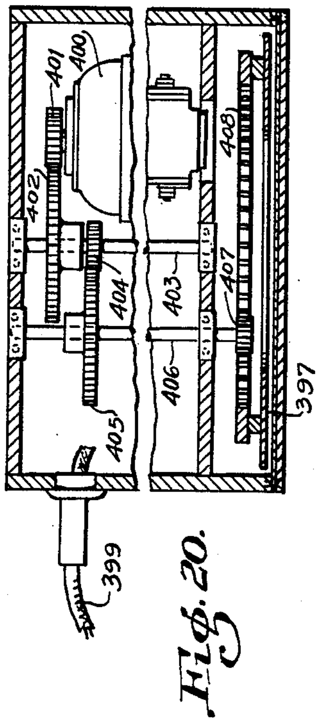
Figure 20 is a cross sectional view on the line 20—20 of Figure 19.

Housed in the same indicator is a compass rose 397, which may be viewed behind a window 398. It will be remembered that the compass follower, Figs. 15, 16 and 17, is provided with a synchro motor 90. This motor is connected by means of a lead 399 to a motor 400, which drives a pinion 401 which drives a gear 402 secured to shaft 403, which also carries a pinion 404. The pinion 404 drives a gear 405 secured to shaft 406, which carries a pinion 407, which meshes with an internal ring gear 408 secured to the compass rose 397. The ammeter needle 395, being viewable over the face of the compass rose, would indicate not only the direction that the helmsman should change his course in case the angle *b* does not equal the angle *p*, but also the approximate number of degrees of the change, if any, required.

The knob 176, Fig. 1, enters the horizontal range R. This knob is secured to a sleeve 413, Fig. 40, rotatable on a shaft 414, to which is secured the range rate knob 177, Fig. 1. A gear 415 is secured to the sleeve 413, which gear drives a pinion 416 secured to a shaft 417 on which is mounted a bevel pinion 418, Figs. 29 and 40. The parts driven by pinion 418 will be hereinafter described in connection with Figs. 32 and 33.

Also secured to the sleeve 413 is the pinion 419, Fig. 40, which drives a gear 420 secured to a shaft 421, to which is secured a pinion 422. As shown in Figs. 29 and 30, the pinion 422 drives a rack 423, which rack, therefore, is actuated an amount corresponding to the value R. The rack 423 is connected to a lever 424, Fig. 29, by means of a pin 425, the lever 424 being mounted on a fixed pivot 426. The other end of the lever 424 is connected to the rod 226 by means of a pin 427. As heretofore explained, it is this rod 226 which actuates the lever 227 an amount corresponding to the horizontal range R and which controls the micro switch 225, the said switch being closed when the range R, as entered by the lever 227, equals the computed range at a predetermined number of seconds, such as thirty seconds, before time to fire, and which switch controls the circuit leading to the solenoid 232 of the clutch and cam mechanism, as shown in Figs. 41, 42 and 43, which in turn controls the lights in the time to fire indicator 178.

It will also be remembered that this same lever 227 actuates the rod 141 connected to lever 137, Fig. 29, which enters the value R on the link 134 of the division mechanism, including the links 133, 134 and 135, and the levers 130 and 143. It will be remembered that this division mechanism transmits to the output rod 146 a movement corresponding to the value $$\frac{D^2}{2.38R}$$

which, according to Formula #2, is $cRs$, which value is transmitted through the differential 150, having one input $cRs$ and the other input R so that the shaft 155, Fig. 25, is rotated an amount corresponding to the value $Rs$ which is the value of slant range, in accordance with Formula #1. Furthermore, it will be remembered that the shaft 155 has a pointer 156 which rotates behind a slant range scale 157, so the slant range can be directly read.

It will also be remembered that the rod 323, Fig. 29, is connected to the upper end of lever 227, which rod extends to the upper end of lever 325, and it will be remembered that the output 326 of the lever 325 is connected through the various links and levers to the lever 385, which controls the arm 391 which is used in connection with the resistor 392 so that the current to ammeter needle 395 will be varied, depending upon the relative value of angles *b* and *p*. The needle would be in its zero position when the angle *b* is equal to the angle *p*, which is the condition when the destroyer is on its correct attack course.

The rack 423 is connected to a link 427 by means of a pin 428. The link 427 is connected to a lever 429 by means of a pin 430, the lever 429 having a fixed pivot 431. The lever 429 is connected to a rod 432 by means of a pin 433. The rod 432 is connected to a slide bar 434, Figs. 29 and 35, by means of a pin 435. The slide bar 434 is, therefore, actuated an amount corresponding to the value of the range R. The slide bar 434 extends through a ball and disc integrator housing 436, Figs. 29, 31, 35 and carries a holder 437 in which two balls 438 and 439 are mounted. These balls touch each other, and the ball 439 contacts a face of a disc 440 secured to a shaft 441 to which is secured an output gear 442. The other ball 438 contacts a cylinder 443 mounted on a shaft 444.

Figure 32:
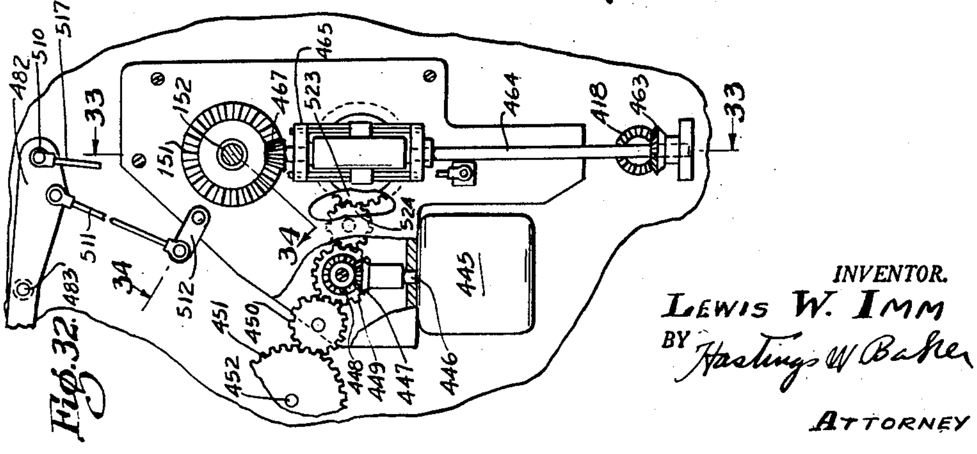
Figure 32 is a bottom plan view of the range integrator mechanism.

A constant speed motor 445, Fig. 32, drives a shaft 446, to which is secured a bevel gear 447, which drives a bevel gear 448 which drives a pinion 449. The pinion 449 drives a gear 450 which drives a gear 451, Figs. 32 and 35. The gear 451 is secured to a shaft 452 which extends through the housing 436 and carries a disc 453. The gear 451 also drives the gear 237 (Figs. 3 and 41) through the gear train shown in Fig. 3.

As will hereinafter be described in connection with Fig. 31, the rod 454 is actuated an amount corresponding to $Vd \sin p - Vs \sin a$. This rod is connected to a slide bar 455, which is similar to the slide bar 434 and is provided with a holder 456, also carrying two balls which contact each other, one of which contacts the inner face of the disc 453, and the other of which contacts cylinder 443.

As is well known, ball and disc integrators may be used so as to multiply or divide. For instance, if the rotation of the disc 453 is constant and the balls carried by the holder 456 are moved toward or away from the center of rotation of the disc 453, the resultant motion of the cylinder 443 would vary. If the ball contacting the disc 453 were positioned at the center of rotation of said disc, no motion would be transmitted to the cylinder 443. As we actuate the slide bar 455, so as to move the balls away from the center of rotation of disc 453, we, in effect, multiply the time, which is a function of the constant speed rotation of the disc 453, by $Vd \sin p - Vs \sin a$, which is the value introduced through the rod 455, and this product is transmitted to the cylinder 443.

Figures 33, 34, 35:
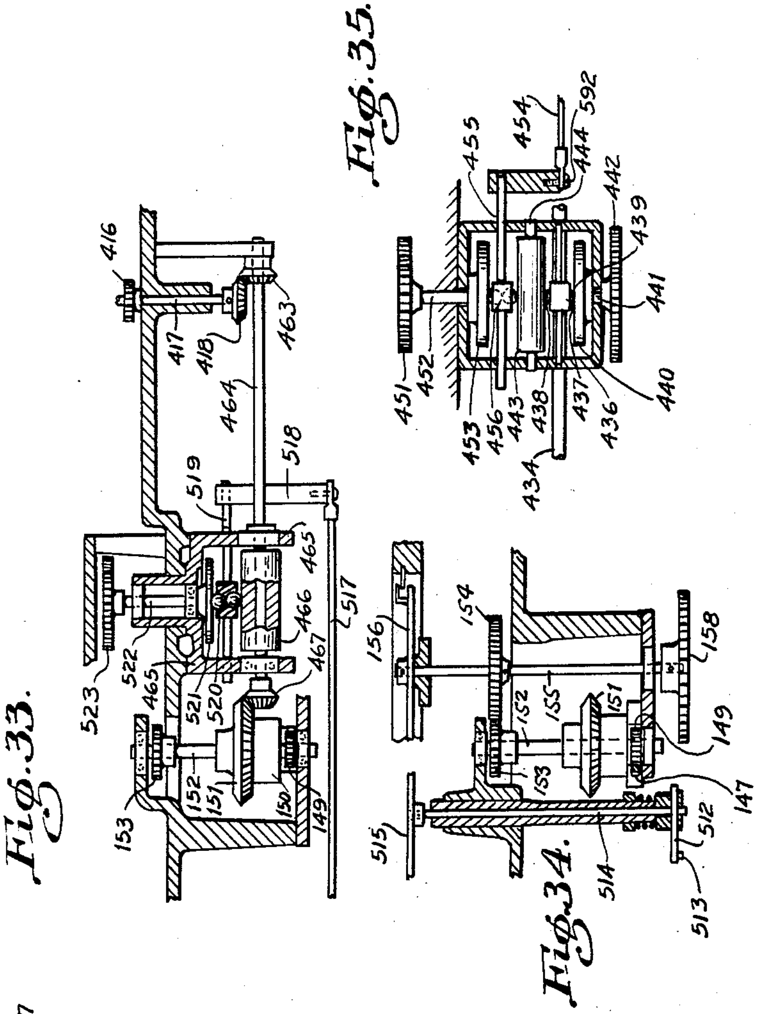
Figure 33 is a cross sectional view on the line 33—33 of Figure 32.
Figure 34 is a view, largely in cross section, on the line 34—34 of Figure 32.
Figure 35 is an elevational view taken on the line 35—35 of Figure 31 looking in the direction of the arrows.

In like manner, the lower portion of the mechanism shown in Fig. 35 might be considered as a division mechanism in which the above stated product is divided by R, which value is entered by the slide bar 434, so that the output gear 442 rotates an amount corresponding to $$\frac{Vd \sin p - Vs \sin a}{R}$$

The term $$\frac{Vd\ sin\ p - Vs\ sin\ a}{R}$$

has been integrated in the double integrator and the integration of the above term is the integration of $$\frac{dp}{dt}$$

which is the change in the angle *p* or the change in the angle *e* since the rate of change of angle *p* and the rate of change of angle *e* are the same, as heretofore explained in connection with Formula #4.

This gear 442, therefore, is rotated an amount corresponding to the amount of change of angle *e*. As shown in Fig. 45, the gear 442 drives a gear 457 secured to a shaft 458, to which is connected a pinion 459, which drives a gear 460 secured to shaft 461, to which is secured a pinion 462, which drives the gear 49, Figs. 36 and 45. It will be remembered that the gear 49, as shown in Fig. 36, is connected to a ring dial 103. In Fig. 37 the indicia of ring dial 103 indicates at pointer 51 this angle *e*, which is the computed generated submarine bearing, as heretofore explained.

As heretofore described, the range knob 176, Fig. 1, actuates the bevel pinion 418, Figs. 29, 32, 33, 38 and 40. The pinion 418 meshes with and drives a pinion 463 which is secured to shaft 464. As shown in Fig. 33, the shaft 464 passes through a ball and disc integrator housing 465 and has a cylinder 466 secured thereto. Secured to the end of shaft 464 is a bevel pinion 467, which drives the gear 151, heretofore described in connection with Fig. 25, it being remembered it was this gear 151 which entered the value of range R in circular motion, and this value was combined in the differential mechanism 150 with a value of $cRs$ and this sum, which is slant range $Rs$, was transmitted to the shaft 155 and pointer 156 which indicates the slant range on the dial 157. It will also be remembered that the shaft 155 rotates the gear 158 an amount corresponding to slant range, which motion was transmitted through the gearing 159 and 161 of Fig. 4 to the motor 163, which movement is eventually transmitted to the range recorder 166.

The ball and disc integrator, shown in Fig. 33, performs no function when the range is being manually entered through the shaft 464 to the gear 151, but this integrator is useful in correcting the range as the range changes, as will hereinafter be described.

Referring to Fig. 2, there is a submarine course and submarine speed indicator, including a pointer 468 movable behind a graduated transparent plate 469. This plate 469 has concentric circular lines 470 etched on the face thereof. The radii of these circles represent knots representing the speed of the submarine. It is also provided with numerals 471 representing degrees. As will hereinafter be described, the transparent plate 469 rotates with the disc 103, it being geared thereto.

In order to understand the operation and utility of the submarine course and speed indicator, it might be well to review the functions of the discs 50 and 103, and the pointers 115 and 116. Perhaps it would make the review easier if we turned Fig. 47 so that the line AB thereof would pass vertically through the center of the shaft 104 and the center of the submarine course and speed plate 469 of Fig. 2. The reading on the disc 50 at the pointer 51 is the bearing of the submarine as received through the sound projector and would correspond to the angle *e* of Fig. 47.

The reading on the disc 103 at the pointer 51 is the computed generated submarine bearing, which is likewise the angle *e*. In Fig. 47 this angle *e* is approximately 120°, and it is the numeral 120 which appears below the pointer 51 on both the disc 50 and the ring disc 103.

The pointer 115 points to the numeral on disc 103 corresponding to the course to steer which is the sum of the angles *e* and *b* of Fig. 47. However, since the numeral 120 on disc 103 below the pointer 51 shows the angle *e* in degrees, the angle formed through the tip of pointer 51 and the center of shaft 104 (which line passes through the numeral 120 on disc 103 and the same numeral on disc 50), and the line from center of shaft 104 to the end of pointer 115, represents the angle *b*.

The pointer 116 points to the degrees on dial 103 that the destroyer is following so that the angle formed between the line passing through the pointer 51 and the center of shaft 104, and the line passing through the center of shaft 104 and the end of pointer 116, represent the angle *p*, the angles *p* and *b* being of equal value when the destroyer is on the correct course, in which case the pointers 115 and 116 would point in the same direction.

Since the ring disc 103 is geared to the plate 469, which forms the submarine course and speed indicator, the numeral 120 appears on the line passing from the center of the plate 469 to the pointer 51, so that the reading at this point would likewise show the angle *e*. It is not necessary, however, to give a reading at this point. The angle formed between the said vertical line and the line passing through the center of the plate 469 and the pointer 468 is equal to the angle *a* of Fig. 47. The degrees of the numerals 471 adjacent to the pointer 468 would, therefore, show the submarine course which, as shown in Fig. 47, is approximately 173° from the north and south line passing through the point B.

Also, if the pointer 468 were moved vertically from its center position an amount corresponding to *Vs* cos *a*, and were moved horizontally a value corresponding to *Vs* sin *a*, the resultant vector would be V*s*, as shown in Fig. 47, which is the speed of the submarine. The circle below which the pointer 468 appears represents this speed of the submarine in knots and the pointer 468 is in fact moved a distance corresponding to the components *Vs* cos *a* and *Vs* sin *a*, as will hereinafter be described.

There is a range rate knot 177, Fig. 2, which is secured to shaft 414, Fig. 40, which passes through the sleeve 413 and carries a gear 472 which drives a pinion 473 secured to shaft 474. The shaft 474 carriees a pinion 475. The pinion 475 is also shown in Fig. 31 as driving a rack 476 which actuates two rods 477 and 478. This range rate knob enters a value corresponding to the product *Vs* cos *a* which value is transmitted to a pin 479 of a lever 480 pivoted on a pin 481 mounted on a lever 482, the lever 482 being mounted on a fixed pivot 483. The other end of said lever 480 is connected by a pin 484 to a rod 485, which enters a value *Vd* cos *p* on the lever 480. The means by which the rod 485 is actuated an amount corresponding to the value *Vd* cos *p* will now be described.

It will be remembered that the gear 108, Figs. 36 and 45, rotates an amount corresponding to the value *p*. It has secured thereto a crank arm 486 and a second arm 487. The arm 486 carries a pin 488 and the arm 487 carries a pin 489. The angle between the center of pin 488 and the center of shaft 104, and the line between the center of the shaft 104 and the center of pin 489 is a right angle. The rod 490 is secured to the pin 489 and a rod 491 is secured to a pin 488, the rod 490 being actuated an amount corresponding to cos *p*, and the rod 491 being actuated an amount corresponding to sin *p*.

Figure 30:
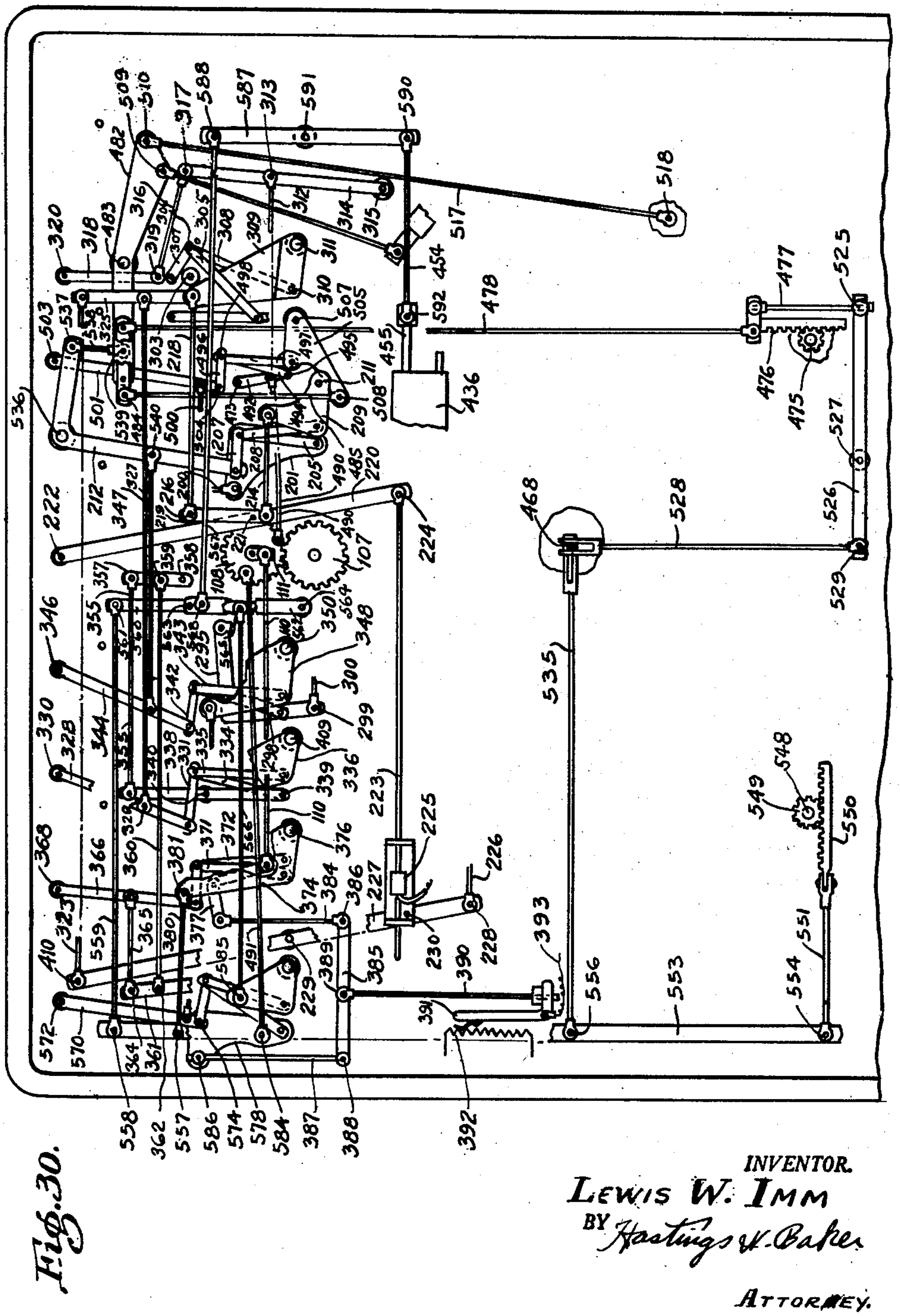
Figure 30 is a bottom plan view of a portion of the bearing mechanism.

The rod 490, Figs. 30 and 45, extends to a lever 492, Figs. 28 and 30, the lever 492 being mounted on a fixed pivot 493. The lower end of the lever 492 is connected to a link 494 by means of a pin 495. The link 494 is connected to the link 496 and to the link 497 by means of a pin 498.

It will be remembered that the pinion 74, Fig. 28, actuates a rack 276 to move a lever 278 an amount corresponding to V*d*. This lever 278 is connected by a pin 499 to a rod 500, Figs. 28 and 30, which rod is connected to a lever 501 by means of a pin 502, the lever 501 being mounted on a fixed pivot 503. The lever 501 is connected to the link 496 by means of a pin 504. The muliplying linkage 492, 494, and 497 performs the function of multiplying the value V*d* entered through link 496 to the value cos *p* entered through rod 490, and this product is tr::asmitted to lever 505 by means of pin 506, the lever 505 being mounted on a fixed pivot 507. The lever 505 is connected by pin 508 to the rod 485 which, it will be remembered, communicates the value *Vd* cos *p* to the pin 484 of lever 480. The lever 480 is a subtraction lever so that the value *Vs* cos *a*, entered through the rod 478, is subtracted from the value *Vd* cos *p*, entered through the rod 485. This value *Vd* cos *p*—*Vs* cos *a* is the rate of change in range R, which is $$\frac{dR}{dt}$$

Formula #' 3.

The lever 482 is provided with two output pins 509 and 510. The pin 509 is connected to a rod 511 connected to a crank arm 512, Figs. 31 and 34, by means of a pin 513. The crank arm 512 is connected to the shaft 514 which carries a range rate pointer 515 which, as shown in Fig. 2, passes over a scale 516 to indicate the range rate.

The output pin 510 is connected to a rod 517 connected to a bar 518, Figs. 31 and 33, which bar 518 carries a slide bar 519 which carries the holder 520 for the balls of the ball and disc integrator shown in Fig. 33, one of the balls contacting the cylinder 466 and the other of the balls contacting a disc 521 secured to a shaft 522 on which is secured a gear 523, Figs. 32 and 33. The gear 523 is driven by a pinion 524 which is driven by the constant speed gear 449, heretofore described in connection with Fig. 32.

It would be remembered, therefore, that the cylinder 466 may be driven from the constant speed motor 445 or may be manually adjusted by rotating the range knob 176. The range knob is used merely to enter manually the value of range or to correct the range. When the shaft 464 is manually operated, the balls simply slide circumferentially of the cylinder 466 and the gear 151 is directly actuated by the rotation of the shaft 464. As long as there is no change in R, the rod 517 would position the balls in the holder 520 at the center of the disc 521 so that the rotation of the said disc from the constant speed motor would produce no rotation of the cylinder 466 and the range, as manually entered on the gear 151, would remain unchanged. If, however, there were any rate of change in R, the rod 517 would be actuated correspondingly so as to position the balls of the ball and disc integrator relative to the center of the disc 521. The term *Vd* cos *p*—*Vs* cos *a* would be integrated in the integrator shown in Fig. 33 and the integration of the above term is the integration of $$\frac{dR}{dt}$$

which is the automatic change of R added or subtracted to the initial manual setting of R. The operator would, therefore, initially set in the range, and the change in range rate would be entered through the rod 517 and the gear 151 would be actuated an amount corresponding to the correction.

As heretofore explained, the lever 227 is actuated an amount corresponding to range R, which is a varying value, and therefore the lever 227 must be initially manually operated to enter the range R and is subsequently actuated an amount corresponding to any change in the value of R. Turning the knob 176, Fig. 2, manually enters the value R, which is transmitted to lever 227 by means of sleeve 413, Fig. 40, pinion 419, gear 420, shaft 421, pinion 422, Figs. 40 and 29, rack 423, Fig. 29, lever 424 and rod 226, and the integrator shown in Fig. 33 is actuated automatically to correct the value of R as the range changes so that the cylinder 466, Fig. 33, is actuated an amount corresponding to this correction, thereby rotating shaft 464, Fig. 33, gears 463, and 418, shaft 417, pinions 416 and 415, Fig. 40, sleeve 413, and thence to lever 227 as described above. The lever 227 is therefore initially operated manually an amount corresponding to range, and this value is constantly and automatically corrected by the integrator shown in Fig. 33. It will also be remembered that this lever 227 controls the micro-switch 225, the said switch being closed when the range R, as entered by the lever 227, equals the computed range at a predetermined number of seconds, such as thirty seconds before time to fire, and this switch controls the circuit leading to the solenoid 232 of the clutch and cam mechanism shown in Figs. 41, 42 and 43, which in turn controls the lights in the time to fire indicator 178.

It will be remembered that the pinion 475, Fig. 31, is rotated an amount corresponding to the value *Vs* cos *a* and this value is transmitted to the rod 477. The rod 477 is connected by a pin 525 to a lever 526 having a fixed pivot 527. The lever 526 is connected to a rod 528 by means of a pin 529. The rod 528 is connected to the lower end of a pointer 468, Figs. 2, 31 and 44.

Figure 44:
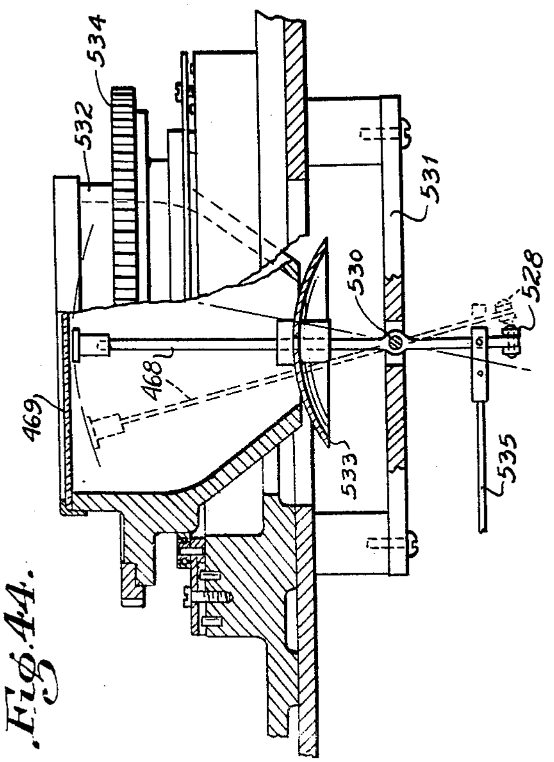
Figure 44 is the indicating assembly, partly in cross section, of the submarine course and speed.

The pointer 468 is connected by a universal joint 530 supported by a fixed panel 531. The pointer extends within a housing 532 which is cylindrical in its upper portion, as shown in Fig. 44, and is conical as shown in its lower portion, the lower portion of the conical section being cut away and being closed by cylindrical shield 533 carried by the pointer 468. The housing 532 is provided with a gear 534, Figs. 44 and 45, which gear is driven by a pinion 462 which, it will be remembered, drives the gear 49. It will be remembered that the gear 49 drives the ring gear 103, Figs. 2 and 36. The housing 532 carries the translucent plate 469, which constitutes the scales for the submarine course and speed, as heretofore described in connection with Fig. 2. Since the gear 462 meshes with both gears 49 and 534, and since these gears are the same size, it is, therefore, apparent that the ring disc 103 and a translucent scale 469 of the submarine course and speed indicator would rotate the same amount and in the same direction. The rod 528 actuates the pointer 468 below the scale 469 in a vetrical direction and in an amount corresponding to *Vs* cos *a*.

As will hereinafter be described, a rod 535 is likewise connected to the pointer 468 and, as shown in Figs. 30, 31 and 44, it extends at right angle to rod 528 so as to move the pointer horizontally behind the scale 469 and in an amount corresponding to *Vs* sin *a*. As shown in Fig. 47, the resultant vector of the components V*s* cos *a* and V*s* sin *a* is the velocity, V*s*, of the submarine, so that the outer end of this pointer is positioned below the scale 469 a distance corresponding to the speed in knots of the submarine. Also, the pointer 468 would, in effect, be moved vertically a distance corresponding to *Vs* cos *a* and horizontally a distance corresponding to *Vs* sin *a*, these movements being at right angles to each other so that the angle between the vertical line passing through the center of the transparent disc 469 and the line passing from the said center through the point where the pointer 468 appears, would constitute the angle *a* of Fig. 47. Since the said indicator 469 has been rotated an amount corresponding to the rotation of the disc 103 which is the angle *e*, the sum of the angle *e* and angle *a* gives the submarine's course which may, therefore, be directly read on the scale 471.

As heretofore mentioned, the link 207 enters the value $$\frac{dR}{dt}$$

into the multiplying linkage 205, 208, and 209, Figs. 4, 28, and 30, forming a part of the actuating means for the rod 223 for micro switch 225. The link 207 is actuated by the bell crank lever 212 through pin 213, lever 212 being mounted on a fixed pivot 536. The other end of the lever 212 is provided with a pin 537 on which is mounted a rod 538 connected to lever 482 by means of a pin 539, Fig. 30. As heretofore explained, the lever 482 has a movement corresponding to $$\frac{dR}{dt}$$

The lever 212 is also connected to rod 347 by means of pin 540, therefore actuating the lever 344 an amount corresponding to $$\frac{dR}{dt}$$

Figure 19:
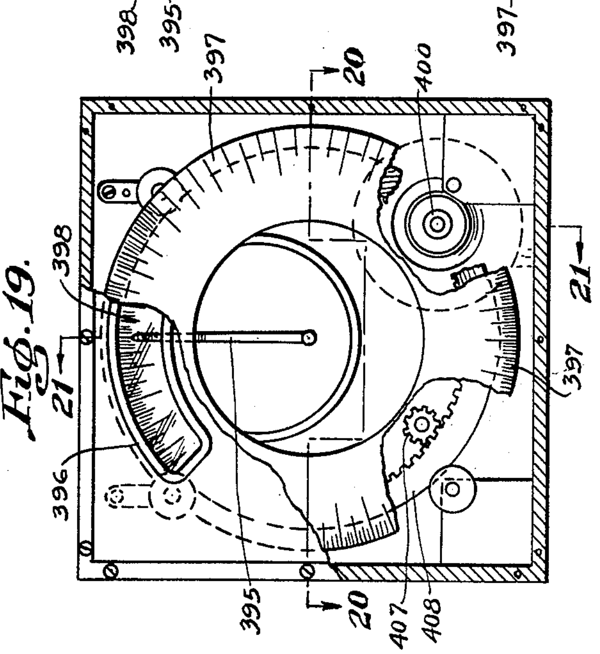
Figure 19 is a front elevational view of Figure 18 with a portion of the front plate removed.

As heretofore explained, this lever 344 serves as a part of the actuating means for the pointer 115 and is a part of the control means of the ammeter needle 395, Fig. 19.

The means whereby the value *Vs* sin *a* is entered through the rod 535 will now be described. In Fig. 1 the knob 541 enters the bearing rate which corresponds to the component of *Vs* sin *a* of Fig. 47. This knob is mounted on a shaft 542 which projects through the front plate and which shaft carries a gear 543, Fig. 40. The gear 543 drives a gear 544 mounted on a shaft 545 which carries a gear 546. The gear 546 drives a pinion 547 secured to a shaft 548 on which is secured a pinion 549 which drives a rack 550. The rack 550 is connected to a rod 551 by means of a pin 552. The rod 551, Figs. 4, 30, and 31, is connected to the lower end of a lever 553 by means of a pin 554. The lever 553 is mounted on a fixed pivot 555. The lever 553 is connected to the rod 535 by means of a pin 556. The rod 535 is, therefore, given a movement corresponding to the component *Vs* sin *a* of Fig. 47 for it was this value which was entered by the knob 541. It will be remembered that the rod 535 is connected to the lower end of the pointer 468, the rod 528 moving the pointer vertically behind the transparent plate 469 and the rod 535 moving it horizontally, the distance between the center of the plate 469 and the position of the pointer 468 being the vector V*s* of Fig. 47, V*s* being the speed of the submarine.

I have, therefore, described means to manually set the pointer 468 to show the submarine speed and to show the submarine course, and, as will hereinafter be described, means are provided to correct automatically the position of the pointer as the submarine course and speed change.

The lever 553 is provided with a pin 557, Fig. 30, connected to the rod 380 so that this rod 380 is given a movement corresponding to *Vs* sin *a*. It will be remembered that this rod 380 is connected to the lever 374 by means of a pin 381, which motion is transmitted to a division mechanism of which the lever 374 forms a part and that the output from the division mechanism is transmitted to the bell crank lever 377, one part of which serves as a part of the controlling means of the arm 391 which is moved along the resistor 392 which controls the ammeter needle 395, Fig. 19. It will also be remembered that the other end of the bell crank lever 377 is connected by link 110 to the arm 111 to actuate the pointer 115 an amount corresponding to the angle *b*.

The upper end of the lever 553 carries a pin 558 to which is secured a rod 559. The rod 559 is connected to a lever 560 by means of a pin 561. The lever 560 is connected to a lever 562 by means of a pin 563, the lever 562 being mounted on a fixed pivot 564. The lever 560 extends beyond the pivot pin 563 and at its lower end carries a pin 565 connected to a rod 566. The lever 560 is a subtraction lever, the value *Vd* sin *p* being entered by means of the rod 566 through the pin 565, as will hereinafter be described. The value *Vs* sin *a* is entered through the pin 561 which is actuated from the rod 559, as heretofore described, so that the pin 563 is actuated an amount corresponding to *Vd* sin *p*—*Vs* sin *a*, and this value, of course, is transmitted to the lever 562, which is connected to a rod 567 by means of a pin 568. This rod 567 is, therefore, actuated an amount corresponding to $$Vd \sin p - Vs \sin a$$

The means to actuate the rod 566 an amount corresponding to *Vd* sin *p* will now be described. Referring to Fig. 28, it will be remembered that the pinion 74 introduces the value V*d* to the rack 276 and the lever 278. The lever 278 is connected to a rod 568' by means of a pin 569. The rod 568' is connected to a lever 570 by means of a pin 571, the lever 570 being mounted on a fixed pivot 572. The lever 570 is connected to a link 573 by means of a pin 574, the link 573 serving as an input for the multiplying mechanism now to be described and introduces the value V*d* to the said multiplying mechanism.

The link 573 is connected to links 575 and 576 by means of a pin 577. The link 575 is connected to a bell crank lever 578 by means of a pin 579, the lever 578 being mounted on a fixed pivot 580. The link 576 is connected to a lever 581 by means of a pin 582, the lever 581 being mounted on a fixed pivot 583.

It will be remembered that the pin 488, Figs. 36 and 45, actuates the rod 491 an amount corresponding to the sin *p*. This rod 491 is connected to the lever 578, Fig. 28, by means of a pin 584. The links 575 and 576 and the lever 578 form a multiplying mechanism to multiply the value V*d* introduced by the link 573 by the value sin *p* introduced through the rod 491, and this product is transmitted to the rod 566 by means of a pin 585.

The lever 578 is connected to the rod 387 by means of a pin 586. It will be remembered that this link 387 actuated one end of the lever 385 an amount corresponding to the value of sin *p* and that this lever 385 forms a part of the control mechanism of the ammeter needle 395, Fig. 19.

As above stated, the rod 566 introduces the value *Vd* sin *p* to the lower end of lever 560 and the upper end of the said lever is actuated an amount corresponding to *Vs* sin *a*, and the difference *Vd* sin *p*—*Vs* sin *a* is transmitted to the lever 562 through the pin 563, which movement is also transmitted to the rod 567 by means of the pin 568 which connects the rod 567 to the lever 562. This rod 567 is connected to the upper end of a lever 587, Fig. 30, by means of a pin 588. The lower end of lever 587 is connected to a rod 454 by means of a pin 590, the said lever 587 being mounted near its midpoint on a fixed pivot 591. The rod 454, Figs. 30 and 31, is connected to the rod 455, Fig. 35, by means of a pin 592 and, therefore, actuates this rod *Vd* sin *p*—*Vs* sin *a*.

As heretofore explained in connection with Fig. 35, this rod 454 forms a part of the integrator shown in that figure which has an output gear 442 which leads to the ring dial 103.

The bearing knob 593 is secured to a sleeve 594, Fig. 40, which sleeve is rotatable on the shaft 542 and carries a gear 595 which drives a gear 596 secured to a shaft 597, which shaft 597 also has secured thereto a disc 598 and a gear 599. The gear 599 drives a gear 600 secured to a shaft 601 on which is secured a disc 602. As shown in Fig. 45*a*, the gear 600 meshes with a pinion 603 forming a part of a differential mechanism 604. The pinion 605 forms a part of the differential 604 and meshes with a gear 534, heretofore referred to in connection with Fig. 45.

A constant speed motor 606 drives a shaft 607 to which is secured a bevel pinion 608, which drives a bevel pinion 609 secured to the input shaft 610 of the differential 604. This motor 606 is controlled by a knob 627, Fig. 2, which may be rotated to the L position for the number of seconds the submarine is turning to the left and to the R position for the number of seconds the submarine is turning to the right. When the knob 593 is rotated at the beginning of an operation, it is rotated an amount sufficient to move the ring dial 103 so as to show angle *e* below the pointer 51. The constant speed motor 606 would not be running when the ring dial 103 was being operated by the said bearing knob 593. As the knob 593 is rotated, it would rotate the gears 595, 596, 599, and 600 of Fig. 40, and would rotate the gear 600 and pinion 603 of Fig. 45*a*, the pinion 603 being considered in this case as one input gear of the differential 604, the other input gear being the pinion 609 which is held stationary since the motor 606 is not running. This causes the output gear 605 to rotate the gear 534 of Figs. 45 and 45*a* and the gear 49 through the pinion 462, which gear 49 is the drive gear for the ring dial 103, Fig. 36. After the dial 103 has been rotated to its proper value, the bearing knob 593 is released.

It will be remembered that the rotation of shaft 414, Fig. 40, manually moved the pointer 468 vertically an amount corresponding to *Vs* cos *a*, and the rotation of the knob 541 moved horizontally the said pointer an amount corresponding to *Vs* sin *a*, these two values being the components of vector V*s*, Fig. 47. As the submarine continues on its course, it may change its speed or its direction and, of course, the range is constantly varied. The components *Vs* cos *a* and *Vs* sin *a* will, therefore vary and it is necessary to provide some automatic means to correct the values of these components as their values vary. Such a means is provided as will now be explained.

It will be remembered that the rack 550, Figs. 38, 39, and 40, is moved an amount corresponding to *Vs* sin *a* by the manual rotation of the bearing rate knob 541. This rack passes through a hole 611, Fig. 39, of a holder 613 in a ball and disc integrator housing 612. The rack 550, after passing through the housing 612, passes through a second ball and disc integrator housing 614 and has secured thereto a holder 615 for two balls of the type heretofore described, one of which contacts the disc 602 and the other of which contacts a cylinder 616 secured to a shaft 617 which carries a bevel pinion 618 which meshes with a pinion 619 secured to the shaft 474.

It will be remembered that the range rate knob 177 was used manually to enter a value *Vs* cos *a* which was transmitted through a shaft 414, Fig. 40, to the gear 472 and to pinion 473 and shaft 474, the said shaft also having a pinion 475 which actuates vertically the rack 476, Figs. 4, 30, and 31. As just explained, this same shaft 474 is also connected to the output of the ball and disc integrator mounted in housing 614 by means of the shaft 617 and pinions 618 and 619. The shaft 474 also has secured thereto a pinion 620 which meshes with a rack 621, which rack extends through a hole in the holder 615 in the housing 614 and is connected to the holder 613 in the housing 612. The holder 613 is provided with two balls, one of which contacts the face of disc 598 and the other of which contacts the cylinder 622 secured to the shaft 623 to which is secured a bevel pinion 624 which meshes with a pinion 625 secured to the shaft 548 which, it will be remembered, carries a pinion 549 which meshes with the rack 550.

If the submarine should hold its course, the angle $e$ would vary as the angle $a$. If the submarine should change its course, the change in course would either increase or decrease the angle $a$. It is assumed that the submarine would change its course by traveling on an arc of a circle, and the number of degrees which it is estimated that it would thus change its course would be taken into account by actuating the motor 606, which is a slow but constant speed motor, so as to increase or decrease the angle $a$ by an amount corresponding to the number of degrees turned by the submarine.

It will be remembered that the value $e$ is automatically corrected and added on the ring dial 103, but this is geared to the disc 534 so that the gear 600, Fig. 45*a*, would be rotated an amount corresponding to the change in value of angle $e$, which is the same as the change in value of angle $a$ if the motor 606 were not running, which would be the case when the submarine had not changed its course and is proceeding along a straight line, and this gear 600 would also be rotated an amount corresponding to the changing course of the submarine by the operator running the motor 606 so as to rotate the gear 600 an amount corresponding to the number of degrees turned by the submarine. For instance, suppose it is assumed that the submarine is changing its course in the amount of 1° per second and continued for 20 seconds, making a total change of course of 20°. Also suppose the motor was so geared as to enter 1° for each second which it operates. The operator would in this case have to operate the motor only 20 seconds so as to change the angle $a$ so as to take into consideration the changing course of the submarine. As the gear 600 is thus rotated in accordance with the changing value of the angle $a$ caused by the movements of the destroyer and the submarine, and in accordance with the change of course of the submarine, the disc 602 is likewise rotated as is the disc 598.

The holder 613 is positioned relative to the disc 598 so as to enter the value $Vs \cos a$. The product of $\Delta a$ times $Vs \cos a$ is $Vs \sin a$, which is the output value imparted to the cylinder 622. In like manner, the holder 615 is positioned relative to the disc 602 so as to represent the value $-Vs \sin a$, which value is multiplied by $\Delta a$ which is the rotation of disc 602 which gives an output value to the cylinder 616 of $Vs \cos a$. It is, therefore, obvious that we initially and manually actuated the rack 550 by an amount corresponding to $Vs \sin a$ and this initial value is constantly corrected to the revised value of $Vs \sin a$ by means of the output cylinder 622, which motion is transmitted to the rack 550 and thence, through the rod 551 to the lever 553 and through the rod 535 to the pointer 468, thereby constantly correcting the horizontal position of this pointer as the component $Vs \sin a$ varies. In identical manner, the output from the cylinder 616 is transmitted through the shaft 617 and the gearing driven thereby to the rack 476, lever 526, rod 528, and pointer 468 so as to constantly correct the position of the pointer vertically as the value $Vs \cos a$ varies. Since these components extend at right angles to each other, the vector Vs would show the corrected and present speed of the submarine, and the present value of the angle $a$ is read on the numerals 471.

One might question why it is necessary to change the components $Vs \cos a$ and $Vs \sin a$ in case the submarine continued on its same course and at the same speed. This would be necessary because we have assumed that the line AB, Fig. 47, runs vertically through the center of shaft 104 of Fig. 2. Suppose the submarine progresses to some point along the line BJ below B. The line from A to B would no longer be in the same direction as shown in Fig. 47. The angle $e$, as well as the angle $a$, would be varied even though there were no change in course or speed of the submarine. Obviously, therefore, the dial 103 and the disc 469, as the angles $e$ and $a$ vary, would rotate so that it is necessary to change the position of the pointer 468 even though the submarine speed and course should remain constant.

It will be remembered that the lever 553 (Fig. 31) is connected to the rod 380, which constitutes one input to the division mechanism which includes links 374, 371, and 372, and the output of this division mechanism is the bell crank lever 377 which is actuated an amount corresponding to the value sin $b$, according to Formula #8. This bell crank lever is, therefore, constantly and automatically actuated to correct the value of sin $b$. This bell crank lever, it will be remembered, is connected to rod 110, Fig. 36, which, by means of arm 111, rotates pointer 115 an amount corresponding to the value of angle $b$, which angle is constantly corrected as above set forth. It will also be remembered that this bell crank lever is also connected to the lever 385 which leads to the governing means for the ammeter needle 395, Fig. 19.

It will also be remembered that this lever 553 (Fig. 31) is connected to the rod 559, which is connected to lever 560 leading to the rod 454 through link 567 and lever 587 of Fig. 28, and thence, to the integrator housing in the housing 436, Fig. 35. By this means the value $Vs \sin a$ is constantly being altered through the rod 454, Figs. 31 and 35, which leads to the output gear 442 which is used to rotate the ring dial 103 according to the value of angle $e$.

It will be remembered that it is the rod 478 which initially actuates the lever 480, Fig. 31, an amount corresponding to $Vs \cos a$ by the manual operation of the knob 177 and by the means described, this rod 478 is constantly actuated automatically an amount corresponding to any change in the value $Vs \cos a$. It will also be remembered that the rod 485, Fig. 28, actuates the other end of lever 480 an amount corresponding to $Vd \cos p$. The lever 482 is actuated by the pivot pin 481 of lever 480 an amount corresponding to $Vd \cos p - Vs \cos a$, which is the rate of change in range R which is $$\frac{dR}{dt}$$

Formula #3. As heretofore explained, this movement is transmitted to the range rate pointer 515, Fig. 2, by means of link 511 and arm 512, Fig. 28. It will also be remembered that this movement is transmitted through rod 517, Figs. 28 and 33, to the integrator shown in Fig. 33, so that the input gear 151 of the differential 150 is initially manually actuated an amount corresponding to R and is thereafter automatically actuated an amount corresponding to any change in the range R so as to secure a generated range.

As heretofore explained, this differential 150 has a second input, being the pinion 149, and the differential drives the shafts 152 and 155 an amount corresponding to the sum of $R+cRs$ which sum is $Rs$ or slant range, Formula #1. The shaft 155, it will be remembered, actuates the slant range pointer 156, Figs. 2 and 25, and the synchro motor 163, Fig. 4, connected to the synchro motor 165 of the range recorder 166, shown in Figs. 1, 22, and 23. The lever 482 also actuates the link 207 through the lever 212, Fig. 30, so that the change of rate of R is entered into the multiplying mechanism of which the link 207 is an input, which multiplying mechanism forms a part of the actuating mechanism for the micro switch 225 which controls the lights of the time to fire indicator 178.

In preparing for the attack, information would be obtained from the sounding or ranging mechanism of the destroyer from which the submarine's depth would be determined. The operator would actuate the knob 119 corresponding to the depth of the submarine, would enter the dead time by means of the knob 182, the time lag by means of the knob 184 and the distance to the dropping station by the knob 259. He would also enter his own ship speed by the knob 117 and would properly set the knob 248. All of these factors are computer inputs which are known at the beginning of an attack problem, and which generally remain constant during the problem. The setting of own ship speed, dead time, time lag, and submarine depth require no special consideration for either a stern attack or a head-thrown attack. However, in a stern attack the R*e* knob 248 must be turned counterclockwise past zero to the line indicating stern attack, and in a head-thrown attack the knob 259 must be set at zero.

The range rate pointer 515, when appearing to the right of zero, indicates a rate of change in knots of a diminishing range between the destroyer and the target. When this pointer moves to the left of zero, it indicates a rate of change of an increasing range. The movement of this pointer is a calculated value.

The range pointer 156 indicates the slant range R*s* between the destroyer or "own ship" and the target. This value is originally set into the computer by the range knob 176, and as the problem progresses, the value is a calculated one. This range corresponds to the range recorded at the range recorder 174.

The green firing signal 179 lights when there are thirty seconds remaining before the time to fire. The amber signal 180 lights twenty-five seconds later, or five seconds before the time to fire. The red signal 181 indicates the time to fire, and this time to fire is the time for the center charge to hit the target.

The range knob 176 is the lower of the two knobs 177, 176, shown in the lower left-hand corner of Fig. 2, and this knob is used to enter the value of slant range R*s* on the range pointer 156. This is accomplished by rotating the knob 176, which enters the value R, until the pointer 156 indicates on the dial 157 the known slant range R*s*, which value is obtained from the sound gear of the destroyer.

The upper of these two knobs 177 is used to enter the component *Vs* cos *a*, which is the target speed along the sound beam. This value is originally set into the computer, and as the problem progresses, the value is a calculated one.

The bearing knob 593 is the lower of the two knobs designated as "bearing and bearing rate," and it controls the inner ring 103 of the uper center dial. This bearing *e* corresponds to the target bearing received at the sound station represented by the letter A in Figs. 46, 47 and 48, and transmitted through the mean bearing computer 1 to the outer ring 50 of the upper center dial. This value *e* is originally set into the computer, and as the problem progresses, the value is a calculated one insofar as the ring 103 is concerned, but is an actual one when the operator receiving the correct value from the sound gear of the destroyer continues to set in the actual value of *e*.

The upper knob 541 is the bearing rate knob, which enters the value *Vs* sin *a*, which is the target speed across the sound beam. This value is originally set into the computer, and as the problem progresses, the value is a calculated one.

The range rate knob 177 moves the submarine's course and speed pointer 468 up and down an amount corresponding to *Vs* cos *a*, and the bearing rate knob 541 moves this pointer left and right an amount corresponding to *Vs* sin *a*. After these two knobs have been turned, the pointer 468 will indicate the velocity of the target and the direction in which is is traveling.

When the value of own ship's compass course is entered at the compass follower 75 by rotating the knob 80, the inner disc 109 of the upper center dial is moved relative to the ring disc 103 to indicate the value of own ship's compass course, the ring 103 being actuated an amount corresponding to the angle *e* and the disc 109 being actuated an amount corresponding to the angle *p*.

The arrow 115 on the upper disc 103 indicates at all times during the problem the proper course to steer for the attack. This is a calculated value.

*Operation of the main computer during an actual problem*

As soon as the sound station reports a target or submarine has been located, the main computer is turned on with a switch 628 on the right side of the computer, and the operators check to make sure that the following are in phase with each other: the mean bearing splitter 1 with the outer bearing ring 50, the compass follower 75 with a course to steer dial 398, Fig. 15, in box 394, Fig. 1, and with the inner disc 109, Fig. 2, and the speed follower dial 53 with the own ship's speed knob 117.

The compass follower operator turns the knob 80 on this instrument to make the value indicated on the compass rose 76 equal the value given at the compass 79 for the destroyer's course. He continually keeps these two values equal at all times during the problem and thus, own ship's course or the angle *j* is continually visible at the main computer by the pointer 116 pointing to the angular value of *j* on the disc 103.

At the same time the operator for the mean bearing computer 1 enters the bearings into the mean bearing computer as fast as they are received from the sound station, not shown, and thus the target bearings are continually visible at the main computer on the outer bearing ring 50, the reading being taken at the pointer 51. Of course, before entering the bearings, it should be decided whether single bearings or left and right cut-on bearings are to be used.

The operator of the speed follower 53 keeps the speed follower matched with the pitometer log, not shown.

The range recorder operator being advised as to the slant range by the sound gear of the destroyer, which forms no part of the invention, and which, therefore, is not shown herein, turns the range knob 176 until the range pointer 174, Fig. 1, indicates the same value and at the same time enters a value on the range rate knob 177. The range pointer 174 will immediately begin moving. Soon the operator will be advised as to another range, and the range knob 176 is turned to correct the range pointer 174 to the new value obtained from the sound gear. The range rate knob 177 is turned slightly in the same direction as the range knob was just turned to make the said correction. This operation may have to be repeated unless the value indicated by the pointer 174 corresponds with the value obtained from the sound gear. Manipulation of the range rate knob 177 adjusts the target speed component along the sound beam. The own ship's component along the sound beam is automatically calculated in the main computer and is added to the target component to give the range rate indicator by the range rate pointer 515, Fig. 2.

The bearing and bearing rate operator turns the bearing knob 593 until the value of the inner ring 103 of the upper center dial corresponds to the target bearing as indicated on the outer bearing ring 50. This bearing ring 103 will immediately begin moving. Soon another bearing will be seen on the outer ring 50, and the bearing knob 593 is turned to correct the inner bearing ring 103 to the new bearing. The upper knob 541 is turned slightly in the same direction as the bearing knob 593 was just turned to enter a correction to bearing rate. As soon as the next bearing is read on the outer ring 50, the inner bearing ring 103 is again corrected and a bearing rate correction again made in the same direction as the bearing knob was turned. It may be necessary to repeat this operation. If the target is proceeding on a straight course, this operation need be repeated only a few times, and the inner bearing ring 103 will indicate the same bearing as shown on the outer bearing ring 50.

However, if the target is maneuvering the operation must be repeated to keep the inner bearing ring indicating the same value as the outer bearing ring.

Manipulation of the bearing rate knob 541 adjusts for the target speed component across the sound beam. The own ship's component across the sound beam is automatically calculated in the main computer.

During the above operations the small pointer 115 of the main computer is continually indicating on the disc 103 the proper course to steer in attacking a target. The deviation left or right from own ship's present course is indicated by the needle 395, Fig. 19, on the course to steer instrument at the helm. If the pointer 395 moves to the right, the helmsman should steer to starboard until the pointer moves back to the straight up and down position. The compass follower operator should keep the compass follower instrument indicating on ship's course at all times during these maneuvers. The helmsman, of course, should continually steer his destroyer on the attack course and continually keep the small pointer 395 so as to point directly upwardly.

Let us assume that the target has been reported that the ranges and bearings are entered, that the range rate corrections and range corrections are made, and that the bearing rate corrections and the bearing corrections are made, and that the helmsman is steering on the attack course. These operations are continually carried through the attack. Soon the destroyer is close enough to the target so that the green light flashes at the firing station. Now thirty seconds remain to fire and further operation of the main computer is unnecessary. Five seconds before firing, the amber light goes on and when the red light goes on, the firing station fires.

I claim:

1. In a computer for indicating an attack course for ships, the combination of a pair of juxtaposed indicators adapted to be moved in unison in alignment with each other and to be separately moved out of and back into alignment with each other, an adjustable element, means for adjusting said element to positions representative of the relative bearing of a target, a connection between said element and one of said indicators whereby said indicator will be moved in direct proportion to the magnitude of changes in said relative bearing and mechanism including means responsive to values representative of the movement of the ship and target, respectively, and to the range therebetween, and having an operating connection with said adjustable element, for computing an angular value representative of the angle between a desired attack course and the relative bearing of said target with respect to said attack course and having a second operating connection with said other indicator for transmitting said angular value to said other indicator; whereby said indicators are disposed in alignment with each other when said ship is being maintained on a calculated attack course.

2. A triangle solving mechanism for right triangles comprising hypotenuse value entering means, devices for entering a value equal to the square of the value of the altitude, means controlled by said hypotenuse value entering means for multiplying the value entered thereby by a constant value of the order of two, and means controlled by said devices and by said multiplying means for dividing the value entered by said devices by the product registered by said multiplying means and for registering a value equal to the value of the base of the triangle.

3. In a computer the combination of an integrating device comprising driving means, an output element and a member adjustable to vary the rate of movement of said output member by said driving means, a value registering mechanism, a driving connection between said output member and said value registering mechanism, a value entering device, an operating connection between said value entering device and said value registering mechanism including means permitting adjustment of said mechanism independently of the adjustment thereof effected by the driving means of said integrating device, a rate entering device, an operating connection between said rate entering device and the adjustable member of said integrating device, and means for effecting concurrent actuations of said value and rate entering devices in the same directions and in equal amounts.

4. In a computer the combination of an integrating device comprising driving means, an output element and a member adjustable to vary the rate of movement of said output member by said driving means, a value registering mechanism, a driving connection between said output member and said value registering mechanism, a value entering device, an operating connection between said value entering device and said value registering mechanism including means permitting adjustment of said mechanism independently of the adjustment thereof effected by the driving means of said integrating device, a rate entering device comprising a plurality of separately adjustable elements and means for combining the adjusting movements of said elements; and an operating connection between the movement combining means of said rate entering device and the adjustable member of said integrating device.

5. A computer embodying the combination of claim 4 characterized by the inclusion of means for effecting concurrent actuations of said value entering device and of one of the separately adjustable elements of said rate entering device in the same direction and in equal amounts, but independently of another of the separately adjustable elements of said rate entering device.

6. A computer embodying the combination of claim 4 characterized by the inclusion of means for effecting concurrent actuations of said value entering device and of one of the separately adjustable elements of said rate entering device in the same direction, but independently of another of the separately adjustable elements of said rate entering device.

7. In a computer the combination of an integrating device comprising driving means, an output element and a member adjustable to vary the rate of movement of said output member by said driving means, a value registering mechanism, a driving connection between said output member and said value registering mechanism, a value entering device, an operating connection between said value entering device and said value registering mechanism including means permitting adjustment of said mechanism independently of the adjustment thereof effected by the driving means of said integrating device, a rate entering device comprising a first adjustable element, a multiplying mechanism having separately adjustable inputs and an output, and means for combining the output of said multiplying mechanism with the movement of said first adjustable member; and an operating connection between the movement combining means of said rate entering device and the adjustable member of said integrating device.

8. A computer embodying the combination of claim 7 characterized by the inclusion of means for effecting concurrent actuations of said value entering device and of said first adjustable element of said rate entering device independently of the output of said multiplying mechanism.

9. In a computer the combination of an integrating device comprising driving means, an output element and a member adjustable to vary the rate of movement of said output member by said driving means, a value registering mechanism, a driving connection between said output member and said value registering mechanism, a value entering device, an operating connection between said value entering device and said value registering mechanism including means permitting adjustment of said mechanism independently of the adjustment thereof effected by the driving means of said integrating device, a rate entering device, an operating connection between said rate entering device and the adjustable member of said integrating device, and means for effecting concurrent actuations of said value and rate entering devices in the same directions.

References Cited in the file of this patent

UNITED STATES PATENTS

| | | |
|---|---|---|
| 1,516,733 | Jaray | Nov. 25, 1924 |
| 1,743,239 | Ross | Jan. 14, 1930 |

| | | |
|---|---|---|
| 2,116,508 | Colvin | May 10, 1938 |
| 2,188,041 | Estoppey | May 24, 1938 |
| 2,162,698 | Chafee | June 20, 1939 |
| 2,386,884 | Carlson | Oct. 16, 1945 |
| 2,388,680 | Dawson | Nov. 13, 1945 |
| 2,416,363 | Wellings | Feb. 25, 1947 |
| 2,427,463 | Klemperer | Sept. 16, 1947 |
| 2,438,112 | Darlington | Mar. 23, 1948 |

FOREIGN PATENTS

| | | |
|---|---|---|
| 592,719 | Germany | Feb. 13, 1934 |